United States Patent
Takeda

(10) Patent No.: US 10,759,432 B2
(45) Date of Patent: Sep. 1, 2020

(54) VEHICLE CONTROL APPARATUS, VEHICLE CONTROL METHOD, AND VEHICLE CONTROL PROGRAM

(71) Applicant: HONDA MOTOR CO., LTD., Minato-ku, Tokyo (JP)

(72) Inventor: Masanori Takeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 15/742,603

(22) PCT Filed: Jul. 5, 2016

(86) PCT No.: PCT/JP2016/069874
§ 371 (c)(1),
(2) Date: Jan. 8, 2018

(87) PCT Pub. No.: WO2017/010349
PCT Pub. Date: Jan. 19, 2017

(65) Prior Publication Data
US 2018/0201272 A1   Jul. 19, 2018

(30) Foreign Application Priority Data

Jul. 15, 2015 (JP) .................................. 2015-141574
Mar. 15, 2016 (JP) .................................. 2016-051135

(51) Int. Cl.
*B60W 30/18* (2012.01)
*B60W 30/12* (2020.01)
*B60W 30/10* (2006.01)

(52) U.S. Cl.
CPC ...... *B60W 30/18163* (2013.01); *B60W 30/10* (2013.01); *B60W 30/12* (2013.01); *B60W 2554/80* (2020.02)

(58) Field of Classification Search
CPC .......... B60W 30/18163; B60W 30/10; B60W 30/12; B60W 2550/30
(Continued)

(56) References Cited

U.S. PATENT DOCUMENTS 5,166,681 A * 11/1992 Bottesch ................... G01S 3/78
180/167
5,521,579 A   5/1996 Bernhard
(Continued)

FOREIGN PATENT DOCUMENTS

CN   102066185   5/2011
CN   102076541   5/2011
(Continued)

OTHER PUBLICATIONS

International Search Report for International Patent Application No. PCT/JP2016/069874 dated Sep. 13, 2016, 4 pages.
(Continued)

*Primary Examiner* — Tuan C To
(74) *Attorney, Agent, or Firm* — Amin, Turocy & Watson, LLP

(57) ABSTRACT

A vehicle control apparatus includes a detecting unit configured to detect a nearby vehicle that travels near a host vehicle; an estimating unit configured to estimate a positional change of the nearby vehicle detected by the detecting unit; and a period deriving unit configured to derive a lane changeable period during which lane change is possible to a lane change target position set as a relative position with respect to the nearby vehicle that travels in an adjacent lane that is adjacent to a host vehicle lane on the basis of a positional change of the nearby vehicle estimated by the estimating unit.

19 Claims, 26 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 5,699,056 | A * | 12/1997 | Yoshida | G08G 1/20 340/905 |
| 9,114,810 | B2 * | 8/2015 | Sudou | B60K 31/0008 |
| 2005/0015203 | A1 | 1/2005 | Nishira | |
| 2006/0184297 | A1 * | 8/2006 | Higgins-Luthman | B60W 40/04 701/41 |
| 2009/0088925 | A1 * | 4/2009 | Sugawara | B60W 30/12 701/41 |
| 2009/0212930 | A1 * | 8/2009 | Pfeiffer | B60Q 9/008 340/435 |
| 2010/0082195 | A1 * | 4/2010 | Lee | B62D 15/025 701/25 |
| 2010/0198478 | A1 * | 8/2010 | Shin | B60W 10/184 701/96 |
| 2010/0228419 | A1 * | 9/2010 | Lee | G05D 1/0257 701/25 |
| 2010/0253493 | A1 * | 10/2010 | Szczerba | G08G 1/167 340/435 |
| 2010/0324823 | A1 * | 12/2010 | Kobayashi | B60T 7/22 701/301 |
| 2011/0164790 | A1 * | 7/2011 | Sakurai | G06K 9/00798 382/104 |
| 2011/0190972 | A1 * | 8/2011 | Timmons | G01C 21/34 701/31.4 |
| 2012/0296522 | A1 * | 11/2012 | Otuka | G08G 1/167 701/41 |
| 2014/0292559 | A1 * | 10/2014 | Asanuma | G01S 13/931 342/133 |
| 2014/0313070 | A1 * | 10/2014 | Asanuma | G01S 7/41 342/200 |
| 2015/0088382 | A1 * | 3/2015 | Obuchi | B60K 31/00 701/41 |
| 2015/0120137 | A1 * | 4/2015 | Zeng | G05D 1/024 701/41 |
| 2015/0161895 | A1 * | 6/2015 | You | B60W 30/18163 701/70 |
| 2015/0291216 | A1 * | 10/2015 | Sato | B60W 30/08 701/23 |
| 2016/0144859 | A1 * | 5/2016 | Yoo | B60W 30/0956 701/25 |

FOREIGN PATENT DOCUMENTS

| | | |
|---|---|---|
| CN | 103942960 | 7/2014 |
| CN | 104648399 | 5/2015 |
| JP | 2005-38325 | 2/2005 |
| JP | 2009-078735 | 4/2009 |
| JP | 2014-019387 | 2/2014 |
| JP | 2014-076689 | 5/2014 |
| KR | 10-2010-0098845 | 9/2010 |

OTHER PUBLICATIONS

Chinese Office Action for Chinese Patent Application No. 201680040134.3 dated Sep. 27, 2019.

* cited by examiner

FIG. 17
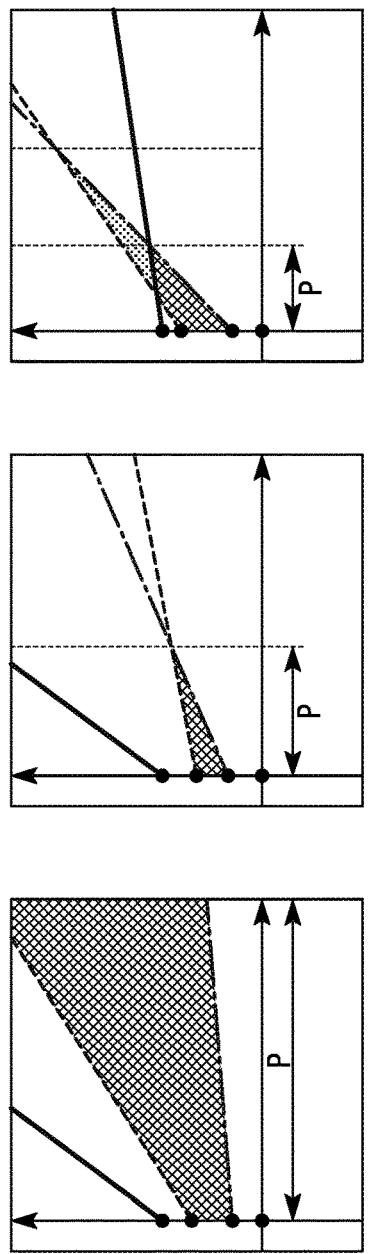
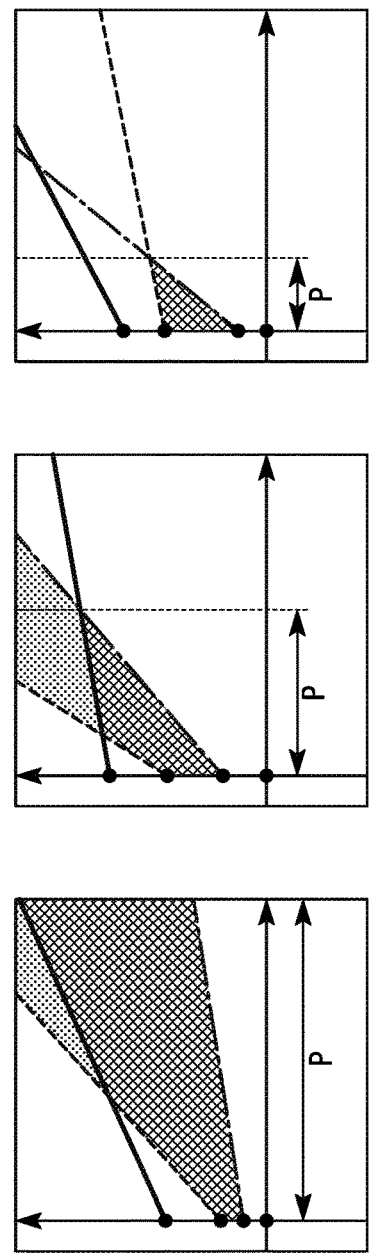

FIG. 18
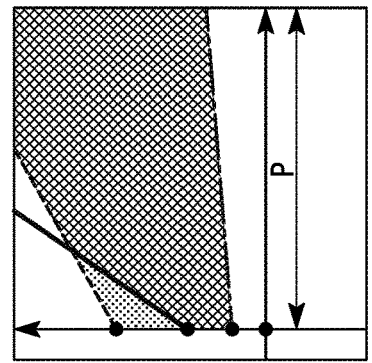
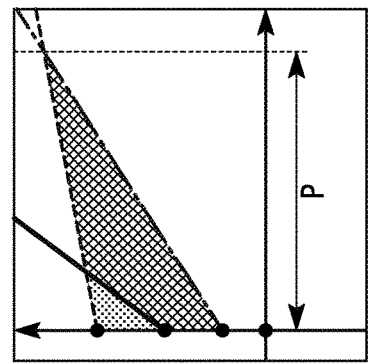
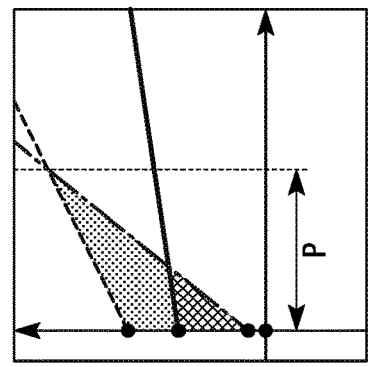
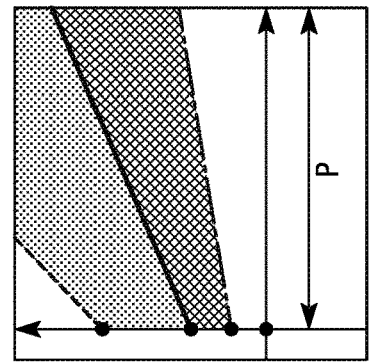
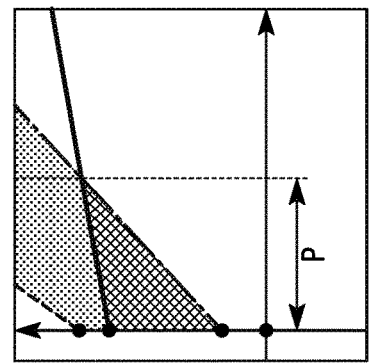
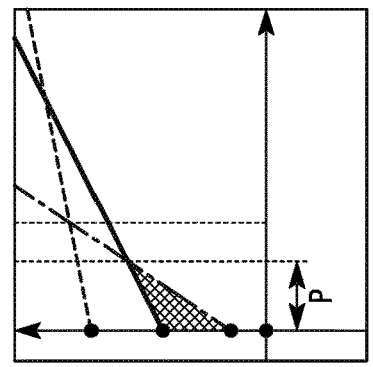

VEHICLE CONTROL APPARATUS, VEHICLE CONTROL METHOD, AND VEHICLE CONTROL PROGRAM

TECHNICAL FIELD

The present invention relates to a vehicle control apparatus, a vehicle control method, and a vehicle control program.

Priority is claimed on Japanese Patent Application No. 2015-141574 filed Jul. 15, 2015 and Japanese Patent Application No. 2016-051135 filed Mar. 15, 2016, the content of which is incorporated herein by reference.

BACKGROUND ART

In the related art, a driving support device including a support starting unit configured to start support for a lane change, a detecting unit configured to detect a relative distance and a relative speed between a host vehicle and another vehicle, a calculation unit configured to calculate a degree of collision risk with respect to the other vehicle when the host vehicle changes lanes on the basis of the relative distance and the relative speed, a first determination unit configured to determine whether to change lanes on the basis of the relative distance, the relative speed, and the degree of collision risk, a decision unit configured to decide a target space for lane change on the basis of the relative distance and the relative speed when it is not possible to change lanes, a second determination unit configured to determine whether there is a space in which lane change is possible in the target space, a setting unit configured to set a target speed toward a lane change waiting position when there is no space and set a target speed toward a lane changeable position when there is a space, and a control unit configured to perform control such that a speed of the host vehicle becomes a target speed is known (for example, refer to Patent Literature 1).

CITATION LIST

Patent Literature

[Patent Literature 1]
Japanese Unexamined Patent Application, First Publication No. 2009-78735

SUMMARY OF INVENTION

Technical Problem

However, the technology of the related art is stuck in determination of whether to change lanes, and there is no consideration of a lane changeable period. Therefore, smooth lane change control cannot be performed in some cases.

Aspects of the present invention have been made in view of such circumstances, and an object of the present invention is to provide a vehicle control apparatus, a vehicle control method, and a vehicle control program which can be used for various processes by deriving a lane changeable period.

Solution to Problem (1) A vehicle control apparatus according to an aspect of the present invention includes a detecting unit configured to detect a nearby vehicle that travels near a host vehicle; an estimating unit configured to estimate a positional change of the nearby vehicle detected by the detecting unit; and a period deriving unit configured to derive a lane changeable period during which lane change is possible to a lane change target position set as a relative position with respect to the nearby vehicle that travels in an adjacent lane that is adjacent to a host vehicle lane on the basis of a positional change of the nearby vehicle estimated by the estimating unit.

(2) The vehicle control apparatus according to the aspect (1) may further include a narrowing unit configured to narrow down a previously set lane change target position to a lane change target position at which the lane changeable period derived by the period deriving unit is longer than a preset period.

(3) The vehicle control apparatus according to the aspect (1) may further include a narrowing unit configured to narrow down a previously set lane change target position to a lane change target position corresponding to a predetermined number of lane changeable periods in order from long lane changeable periods among lane changeable periods derived by the period deriving unit.

(4) The vehicle control apparatus according to the aspect (1) may further include a narrowing unit configured to narrow down a previously set lane change target position to a lane change target position corresponding to the longest lane changeable period among lane changeable periods derived by the period deriving unit.

(5) The vehicle control apparatus according to any one of the aspects (2) to (4) may further include a generating unit configured to generate a control plan including a trajectory for lane change within a lane changeable period corresponding to the lane change target position narrowed down by the narrowing unit; and a travel control unit configured to perform travel control of the host vehicle on the basis of the control plan generated by the generating unit.

(6) The vehicle control apparatus according to the aspect (5) may further include a target position decision unit configured to decide a lane change target position on the basis of safety for evaluating an interval between the host vehicle and a nearby object and a planning ability for evaluating an element including followability to the trajectory regarding the control plan.

(7) The vehicle control apparatus according to the aspect (5) or (6) may further include a target position decision unit configured to decide a position corresponding to a control plan having a wide interval between the trajectory for the host vehicle to change lanes and a nearby object within the control plan as a lane change target position.

(8) The vehicle control apparatus according to any one of the aspects (5) to (7) may further include a target position decision unit configured to decide a position corresponding to a control plan having low acceleration and deceleration of the host vehicle necessary for the lane change within the control plan as a lane change target position.

(9) The vehicle control apparatus according to the aspect (1) may further include a generating unit configured to generate a control plan including a trajectory for lane change within a lane changeable period derived by the period deriving unit, and a travel control unit configured to perform travel control of the host vehicle on the basis of the control plan generated by the generating unit.

(10) In the vehicle control apparatus according to the aspect (9), the generating unit may derive a speed restriction for lane change to the lane change target position within a lane changeable period derived by the period deriving unit and generate the control plan under the derived speed restriction.

(11) In the vehicle control apparatus according to any one of the aspects (1) to (10), the period deriving unit may derive the lane changeable period by a different method according to a position distribution between the host vehicle and a nearby vehicle which is a monitoring target among nearby vehicles detected by the detecting unit.

(12) In the vehicle control apparatus according to the aspect (11), the nearby vehicle which is the monitoring target may include a nearby vehicle that travels immediately before the host vehicle among nearby vehicles detected by the detecting unit and nearby vehicles that travel immediately before and immediately behind the lane change target position.

(13) In the vehicle control apparatus according to any one of the aspects (1) to (12), the period deriving unit may derive the lane changeable period using a timing derived on the basis of the positional change of the nearby vehicle estimated by the estimating unit which is a timing at which the nearby vehicle which is the monitoring target among nearby vehicles detected by the detecting unit catches up with another nearby vehicle as a criterion.

(14) In the vehicle control apparatus according to the aspect (13), the period deriving unit may derive a period until a nearby vehicle that travels immediately behind the lane change target position catches up with a nearby vehicle that travels immediately before the lane change target position as the lane changeable period.

(15) In the vehicle control apparatus according to the aspect (13) or (14), the period deriving unit may derive a period until a nearby vehicle that travels immediately behind the lane change target position catches up with a nearby vehicle that travels immediately before the host vehicle as the lane changeable period.

(16) In the vehicle control apparatus according to any one of the aspects (13) to (15), when the host vehicle needs to overtake a nearby vehicle that travels immediately behind the lane change target position, the period deriving unit may derive a period after the overtake as the lane changeable period.

(17) In the vehicle control apparatus according to any one of the aspects (13) to (16), when the host vehicle needs to be overtaken by a nearby vehicle that travels immediately before the lane change target position, the period deriving unit may derive a period after the overtaken as the lane changeable period.

(18) A vehicle control apparatus according to an aspect of the present invention includes a detecting unit configured to detect a nearby vehicle, which travels near a host vehicle; an estimating unit configured to estimate a positional change of the nearby vehicle detected by the detecting unit; and a determination unit configured to determine whether a nearby vehicle that travels immediately behind a lane change target position set as a relative position with respect to a nearby vehicle that travels in an adjacent lane that is adjacent to a host vehicle lane, among nearby vehicles detected by the detecting unit catches up with another nearby vehicle, and determine whether lane change is possible on the basis of the determination result.

(19) In the vehicle control apparatus according to the aspect (18), when it is determined that a nearby vehicle, which travels immediately behind a lane change target position set as a relative position with respect to a nearby vehicle that travels in an adjacent lane that is adjacent to the host vehicle lane, catches up with another nearby vehicle, the determination unit may generate a trajectory of displacement of the host vehicle using the catch-up point as an end point, and when the generated trajectory satisfies at least a restriction on speed, the determination unit may determine that lane change is possible.

(20) A vehicle control method according to an aspect of the present invention includes detecting a nearby vehicle that travels near a host vehicle; estimating a positional change of the detected nearby vehicle; and deriving a lane changeable period during which lane change is possible to a lane change target position set as a relative position with respect to the nearby vehicle that travels in an adjacent lane that is adjacent to a host vehicle lane on the basis of a positional change of the estimated nearby vehicle.

(21) A vehicle control program according to an aspect of the present invention causes an on-board computer to execute: detecting a nearby vehicle that travels near a host vehicle; estimating a positional change of the detected nearby vehicle; and deriving a lane changeable period during which lane change is possible to a lane change target position set as a relative position with respect to the nearby vehicle that travels in an adjacent lane that is adjacent to a host vehicle lane on the basis of a positional change of the estimated nearby vehicle.

Advantageous Effects of Invention

According to the aspects (1), (20), and (21), the position of the nearby vehicle is detected, the positional change of the nearby vehicle detected by the detecting unit is estimated, and the lane changeable period during which lane change is possible to the lane change target position set as a relative position with respect to the nearby vehicle that travels in an adjacent lane that is adjacent to the host vehicle lane is derived on the basis of the positional change of the nearby vehicle estimated by the estimating unit. Therefore, it can be used for various processes.

According to the aspects (2) to (5), the narrowing unit narrows down the previously set lane change target position to a lane change target position at which the lane changeable period derived by the period deriving unit is longer than a preset period. Therefore, it is possible to decide the lane change target position more easily.

According to the aspect (6), the target position decision unit decides a lane change target position on the basis of safety for evaluating an interval between the host vehicle and a nearby object and a planning ability for evaluating an element including followability to the trajectory regarding the control plan for lane change generated by the generating unit. Therefore, it is possible to decide a lane change target position with high safety and a high planning ability.

According to the aspect (7), the target position decision unit decides a position corresponding to a control plan having a wide interval between the trajectory for the host vehicle to change lanes and a nearby object within the control plan for lane change generated by the generating unit as a lane change target position. Therefore, it is possible to decide a lane change target position with higher safety.

According to the aspect (8), the target position decision unit decides a position corresponding to a control plan having low acceleration and deceleration of the host vehicle necessary for the lane change within the control plan for lane change generated by the generating unit as a lane change target position. Therefore, it is possible to decide a lane change target position with higher safety.

According to the aspect (9), the vehicle control apparatus further includes a generating unit configured to generate a control plan for lane change within a lane changeable period and a travel control unit configured to perform travel control of the host vehicle on the basis of the control plan generated by the generating unit. Therefore, the derived lane changeable period can be used for travel control of the host vehicle.

According to the aspect (10), a speed restriction for lane change to the lane change target position is derived within the lane changeable period derived by the period deriving unit, and a control plan is generated under the derived speed restriction. Therefore, it is possible to prevent the occurrence of a situation in which an unrealizable control plan is planned.

According to the aspects (11) to (17), the lane changeable period is derived by a different method according to a position distribution between the host vehicle and a nearby vehicle which is a monitoring target among nearby vehicles detected by the detecting unit. Therefore, it is possible to derive a lane changeable period by an appropriate method according to the position distribution between the host vehicle and the nearby vehicle.

According to the aspects (18) and (19), the position of the nearby vehicle is detected, the positional change of the detected nearby vehicle is estimated, and it is determined whether a nearby vehicle that travels immediately behind a lane change target position set as a relative position with respect to a nearby vehicle that travels in an adjacent lane that is adjacent to the host vehicle lane among detected nearby vehicles catches up with another nearby vehicle, and it is determined whether lane change is possible on the basis of the determination result. Therefore, it is possible to determine more appropriately whether lane change is possible.

BRIEF DESCRIPTION OF DRAWINGS

FIG. 17 is a diagram showing patterns obtained by classifying positional changes in monitoring target vehicles in a pattern (d).

FIG. 18 is a diagram showing patterns obtained by classifying positional changes in monitoring target vehicles in a pattern (e).

DESCRIPTION OF EMBODIMENTS

A vehicle control apparatus, a vehicle control method, and a vehicle control program according to embodiments of the present invention will be described below with reference to the drawings.

First Embodiment

[Configuration of Vehicle]

Figure 1:
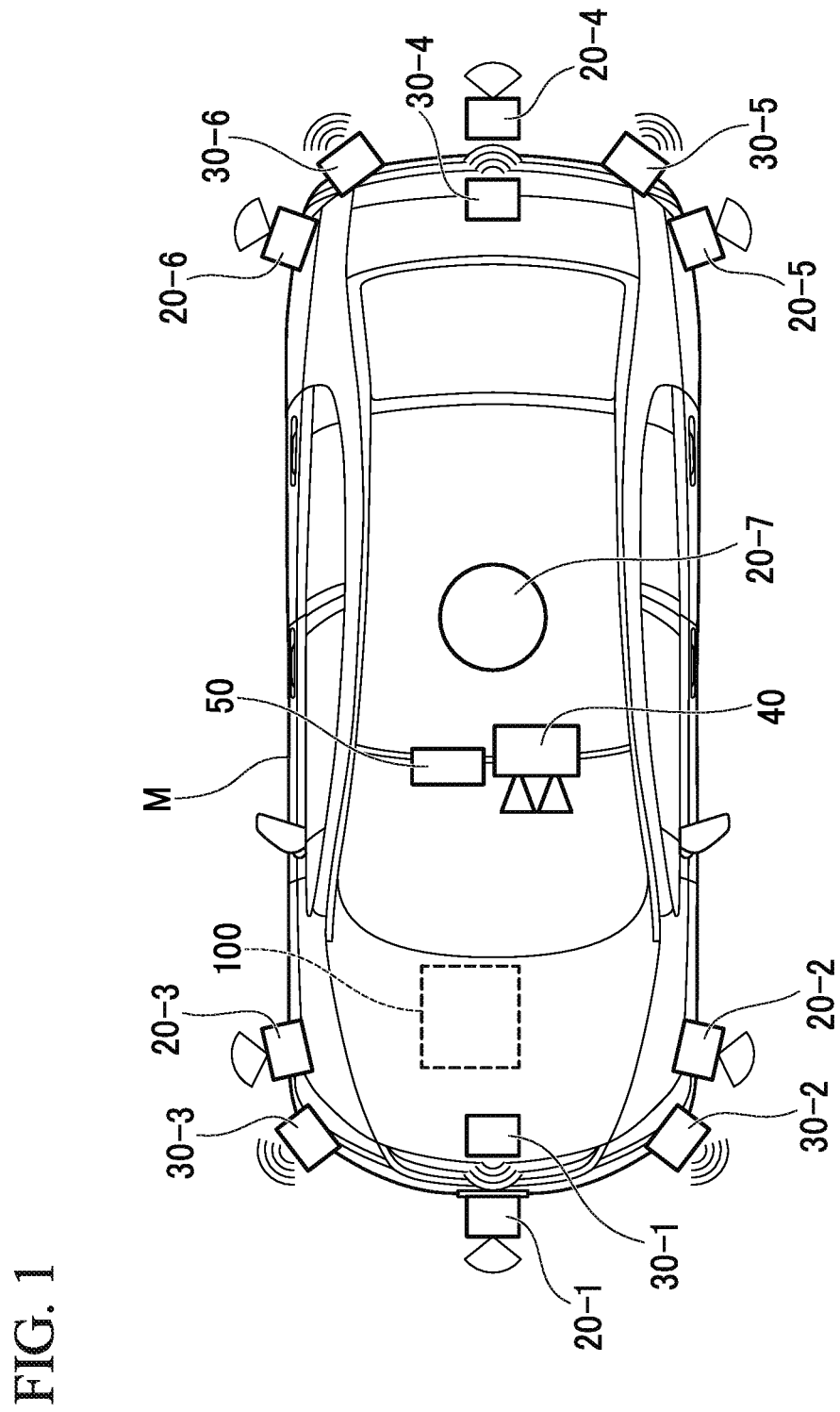
FIG. 1 is a diagram showing components of a vehicle (host vehicle) in which a vehicle control apparatus according to a first embodiment is mounted.

FIG. 1 is a diagram showing components of a vehicle (hereinafter referred to as a host vehicle M) in which a vehicle control apparatus 100 according to a first embodiment is mounted. The vehicle in which the vehicle control apparatus 100 is mounted is, for example, a two-wheel, three-wheel, or four-wheel automobile, and may be an automobile using an internal combustion engine such as a diesel engine or a gasoline engine as a power source, an electric vehicle using an electric motor as a power source, and a hybrid vehicle including an internal combustion engine and an electric motor in combination. In addition, the above-described electric vehicle is driven using power discharged from a battery, for example, a secondary battery, a hydrogen fuel cell, a metal fuel cell, an alcohol fuel cell, or the like.

As shown in FIG. 1, sensors such as finders 20-1 to 20-7, radars 30-1 to 30-6, and a camera 40, a navigation device 50, and the above-described vehicle control apparatus 100 are mounted in the vehicle. For example, the finders 20-1 to 20-7 are light detection and ranging or laser imaging detection and ranging (LIDAR) systems configured to measure scattered light with respect to emitted light and measure the distance to an object. For example, the finder 20-1 is attached to a front grill and the like, and the finders 20-2 and 20-3 are attached to a side surface or a door mirror of a vehicle body, the interior of a headlamp, the vicinity of a side lamp, or the like. The finder 20-4 is attached to a trunk lid and the like, and the finders 20-5 and 20-6 are attached to a side surface of the vehicle body, the interior of a tail lamp, and the like. The above-described finders 20-1 to 20-6 have, for example, a detection range of about 150 degrees with respect to a horizontal direction. In addition, the finder 20-7 is attached to a roof and the like. The finder 20-7 has, for example, a detection range of 360 degrees with respect to a horizontal direction.

The above-described radars 30-1 and 30-4 are, for example, long-range millimeter wave radars having a wider detection range in a depth direction than other radars. In addition, the radars 30-2, 30-3, 30-5, and 30-6 are medium range millimeter wave radars having a narrower detection range in the depth direction than the radars 30-1 and 30-4. When the finders 20-1 to 20-7 are not particularly distinguished, they will be simply described below as a "finder 20." When the radars 30-1 to 30-6 are not particularly distinguished, they will be simply described below as a "radar 30." The radar 30 detects an object according to, for example, a frequency modulated continuous wave (FM-CW) scheme.

The camera 40 is a digital camera using a solid-state imaging device, for example, a charge coupled device (CCD) or a complementary metal oxide semiconductor (CMOS). The camera 40 is attached to an upper portion of a front windshield, a rear surface of a room mirror, or the like. For example, the camera 40 captures an image in front of a host vehicle M periodically and repeatedly.

Here, the configuration shown in FIG. 1 is only an example, and a part of the configuration may be omitted or another configuration may be additionally added.

Figure 2:
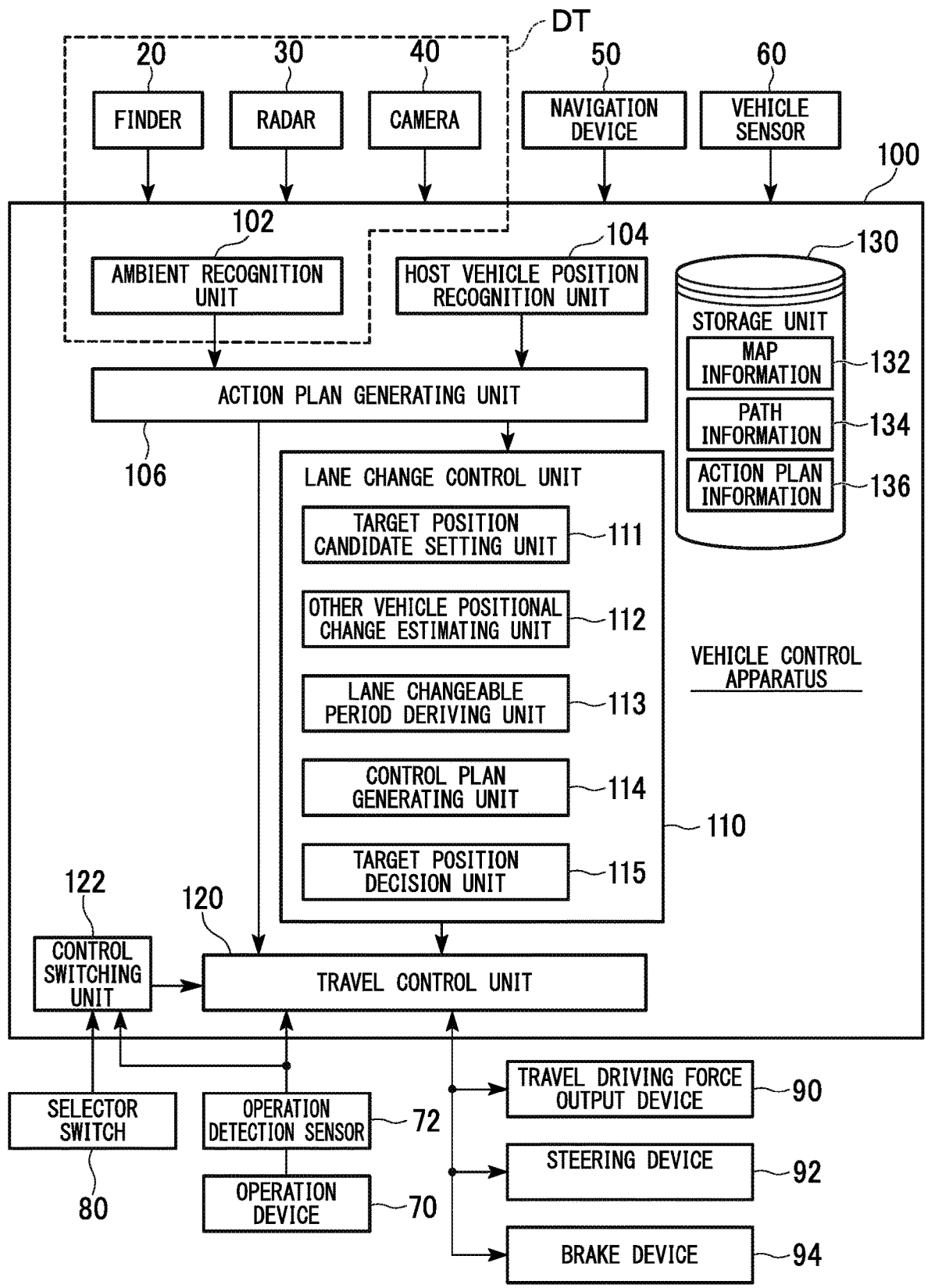
FIG. 2 is a functional block diagram of the host vehicle centered on the vehicle control apparatus according to the first embodiment.

FIG. 2 is a functional block diagram of the host vehicle M centered on the vehicle control apparatus 100 according to the first embodiment. In the host vehicle M, the navigation device 50, a vehicle sensor 60, an operation device 70, an operation detection sensor 72, a selector switch 80, a travel driving force output device 90, a steering device 92, a brake device 94, and the vehicle control apparatus 100 are mounted in addition to the finder 20, the radar 30, and the camera 40.

The navigation device 50 includes a global navigation satellite system (GNSS) receiver, map information (navigation map), a touch panel type display device functioning as a user interface, a speaker, a microphone, and the like. The navigation device 50 identifies a position of the host vehicle M by the GNSS receiver and derives a path from the position to a destination designated by a user. The path derived by the navigation device 50 is stored in a storage unit 130 as path information 134. The position of the host vehicle M may be identified or supplemented by an inertial navigation system (INS) using an output of the vehicle sensor 60. In addition, when the vehicle control apparatus 100 is executed in a manual driving mode, the navigation device 50 performs guidance using a voice or a navigation display regarding the path to the destination. Here, a configuration for identifying the position of the host vehicle M may be provided independently from the navigation device 50. In addition, the navigation device 50 may be realized by, for example, a function of a terminal device such as a smartphone or a tablet terminal that the user holds. In this case, information is transmitted and received between the terminal device and the vehicle control apparatus 100 via radio communication or communication.

The vehicle sensor 60 includes a vehicle speed sensor configured to detect a speed of the host vehicle M (vehicle speed), an acceleration sensor configured to detect an acceleration, a yaw rate sensor configured to detect an angular velocity around a vertical axis, an azimuth sensor configured to detect a direction of the host vehicle M. and the like.

The operation device 70 includes, for example, an accelerator pedal, a steering wheel, a brake pedal, and a shift lever. The operation detection sensor 72 configured to detect whether a driver performs an operation or detect an amount of an operation is attached to the operation device 70. The operation detection sensor 72 includes, for example, an accelerator opening sensor, a steering torque sensor, a brake sensor, a shift position sensor, and the like. The operation detection sensor 72 outputs an accelerator opening, a steering torque, a brake pedal amount, a shift position, or the like as a detection result to a travel control unit 120. Here, alternatively, the detection result of the operation detection sensor 72 may be directly output to the travel driving force output device 90, the steering device 92, or the brake device 94.

The selector switch 80 is a switch that is operated by the driver or the like. The selector switch 80 may be a mechanical switch or a graphical user interface (GUI) switch provided on a touch panel type display device of the navigation device 50. The selector switch 80 receives an instruction for switching the mode between a manual driving mode in which the driver performs an operation manually and an automatic driving mode in which a vehicle travels while the driver does not perform an operation (or while an operation amount is smaller or an operation frequency is lower than that in the manual driving mode), and generates a control mode designation signal for designating a control mode of the travel control unit 120 to either the automatic driving mode or the manual driving mode.

The travel driving force output device 90 includes, for example, either or both of an engine and a motor for travel. When the travel driving force output device 90 includes only an engine, the travel driving force output device 90 further includes an engine electronic control unit (ECU) configured to control an engine. For example, the engine ECU adjusts a throttle opening degree, a shift stage, and the like according to information input from the travel control unit 120, and thus controls a travel driving force (torque) traveling the vehicle. When the travel driving force output device 90 includes only the motor for travel, the travel driving force output device 90 includes a motor ECU configured to drive the motor for travel. For example, the motor ECU adjusts a duty ratio of a PWM signal supplied to the motor for travel and thus controls a travel driving force traveling the vehicle. When the travel driving force output device 90 includes both the engine and the motor for travel, both the engine ECU and the motor ECU control a travel driving force in cooperation.

The steering device 92 includes, for example, an electric motor capable of changing a direction of a steering wheel by applying a force to a rack and pinion function and the like, a steering angle sensor configured to detect a steering angle (or an actual steering angle), and the like. The steering device 92 drives the electric motor according to information input from the travel control unit 120.

The brake device 94 includes a master cylinder to which a brake operation applied to a brake pedal is transmitted as a hydraulic pressure, a reservoir tank in which a brake fluid is stored, a brake actuator configured to adjust a braking force output to wheels, and the like. The brake device 94 controls the brake actuator and the like so that a brake torque with a desired magnitude is output to wheels according to information input from the travel control unit 120. Here, the brake device 94 is not limited to an electronically controlled brake device that is operated by the hydraulic pressure described above, but may be an electronically controlled brake device that is operated by an electric actuator.

[Vehicle Control Apparatus]

The vehicle control apparatus 100 will be described below. The vehicle control apparatus 100 includes, for example, an ambient recognition unit 102, a host vehicle position recognition unit 104, an action plan generating unit 106, a lane change control unit 110, the travel control unit 120, a control switching unit 122, and the storage unit 130. Some or all of the ambient recognition unit 102, the host vehicle position recognition unit 104, the action plan generating unit 106, the lane change control unit 110, the travel control unit 120, and the control switching unit 122 are software function units that function when a processor such as a central processing unit (CPU) executes a program. In addition, some or all of these units may be hardware function units such as a large scale integration (LSI) circuit or an application specific integrated circuit (ASIC). In addition, the storage unit 130 may be realized by a read only memory (ROM), a random access memory (RAM), a hard disk drive (HDD), a flash memory, or the like. The program may be stored in the storage unit 130 in advance or may be downloaded from an external device through an in-vehicle Internet facility or the like. In addition, a portable storage medium in which the program is stored may be mounted in a drive device (not shown) and thus installed in the storage unit 130.

The ambient recognition unit 102 recognizes a state such as a position and a speed of a nearby vehicle on the basis of outputs of the finder 20, the radar 30, the camera 40, and the like. In the present embodiment, the nearby vehicle is a vehicle that travels near the host vehicle M and is a vehicle that travels in the same direction as the host vehicle M. The position of the nearby vehicle may be indicated by a representative point such as the center of gravity or a corner of another vehicle or an area expressed by the contour of another vehicle. The "state" of the nearby vehicle may include information about whether the nearby vehicle accelerates or changes lanes (or tries to) on the basis of information of the above various devices. The ambient recognition unit 102 recognizes whether the nearby vehicle changes lanes (or tries to) on the basis of a history of the position of the nearby vehicle, an operation state of a direction indicator, and the like. In addition, the ambient recognition unit 102 may recognize positions of a guardrail, a telephone pole, a parked vehicle, a pedestrian, and other objects in addition to the nearby vehicle. A combination of the finder 20, the radar 30, and the camera 40, and the ambient recognition unit 102 will be referred to below as a "detecting unit DT" configured to detect a nearby vehicle. The detecting unit DT may further recognize a state such as a position and a speed of the nearby vehicle through communication with the nearby vehicle.

Figure 3:
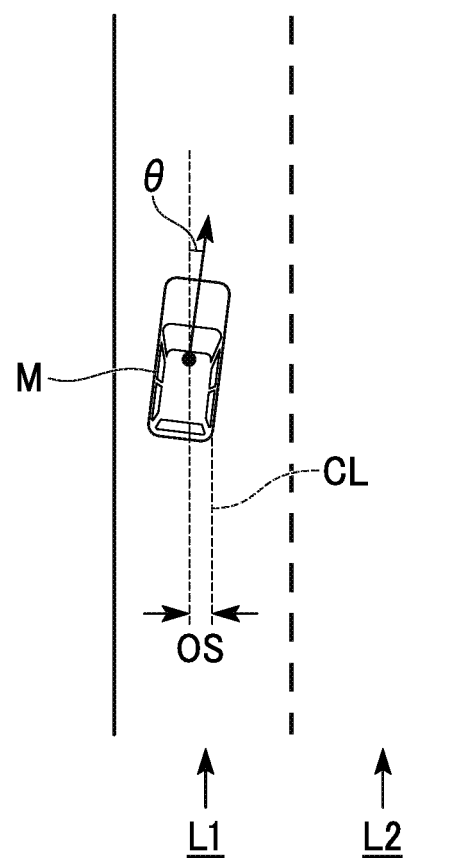
FIG. 3 is a diagram showing a state in which a relative position of a host vehicle with respect to a travel lane is recognized by a host vehicle position recognition unit.

The host vehicle position recognition unit 104 recognizes a lane in which the host vehicle M travels (host vehicle lane) and a relative position of the host vehicle M with respect to a travel lane on the basis of map information 132 stored in the storage unit 130 and information input from the finder 20, the radar 30, the camera 40, the navigation device 50, or the vehicle sensor 60. The map information 132 is, for example, map information with higher accuracy than the navigation map that the navigation device 50 has and includes lane center information, lane boundary information, and the like. FIG. 3 is a diagram showing a state in which a relative position of the host vehicle M with respect to a travel lane is recognized by the host vehicle position recognition unit 104. For example, the host vehicle position recognition unit 104 recognizes an angle θ formed by lines connecting a deviation OS from a travel lane center CL at a reference point (for example, the center of gravity) of the host vehicle M and the travel lane center CL in the travel direction of the host vehicle M as a relative position of the host vehicle M with respect to the travel lane. Here, alternatively, the host vehicle position recognition unit 104 may recognize a position of a reference point of the host vehicle M with respect to one side end of a host vehicle lane L1 as a relative position of the host vehicle M with respect to the travel lane.

The action plan generating unit 106 generates an action plan in a predetermined section. The predetermined section is, for example, a section in a toll road such as a highway within a path derived by the navigation device 50. However, the present invention is not limited thereto and the action plan generating unit 106 may generate an action plan for an arbitrary section.

The action plan includes, for example, a plurality of events that are sequentially executed. The events include, for example, a deceleration event in which the host vehicle M is decelerated, an acceleration event in which the host vehicle M is accelerated, a lane keep event in which the host vehicle M travels without deviating from a travel lane, a lane change event in which a travel lane is changed, an overtaking event in which the host vehicle M overtakes a vehicle in front of it, a branch event in which the lane is changed to a desired lane at a branch point or the host vehicle M travels without deviating from a current travel lane, a merging event in which the host vehicle M is accelerated and decelerated at a lane junction point and a travel lane is changed, and the like. For example, when there is a junction (branch point) on the toll road (for example, a highway), the vehicle control apparatus 100 needs to change lanes or maintain the lane so that the host vehicle M advances toward the destination in the automatic driving mode. Accordingly, when it is determined that there is a junction on the path with reference to the map information 132, the action plan generating unit 106 sets a lane change event in which the lane is changed to a desired lane in which the vehicle can advance toward the destination from a current position (coordinates) of the host vehicle M to a position (coordinates) of the junction.

Figure 4:
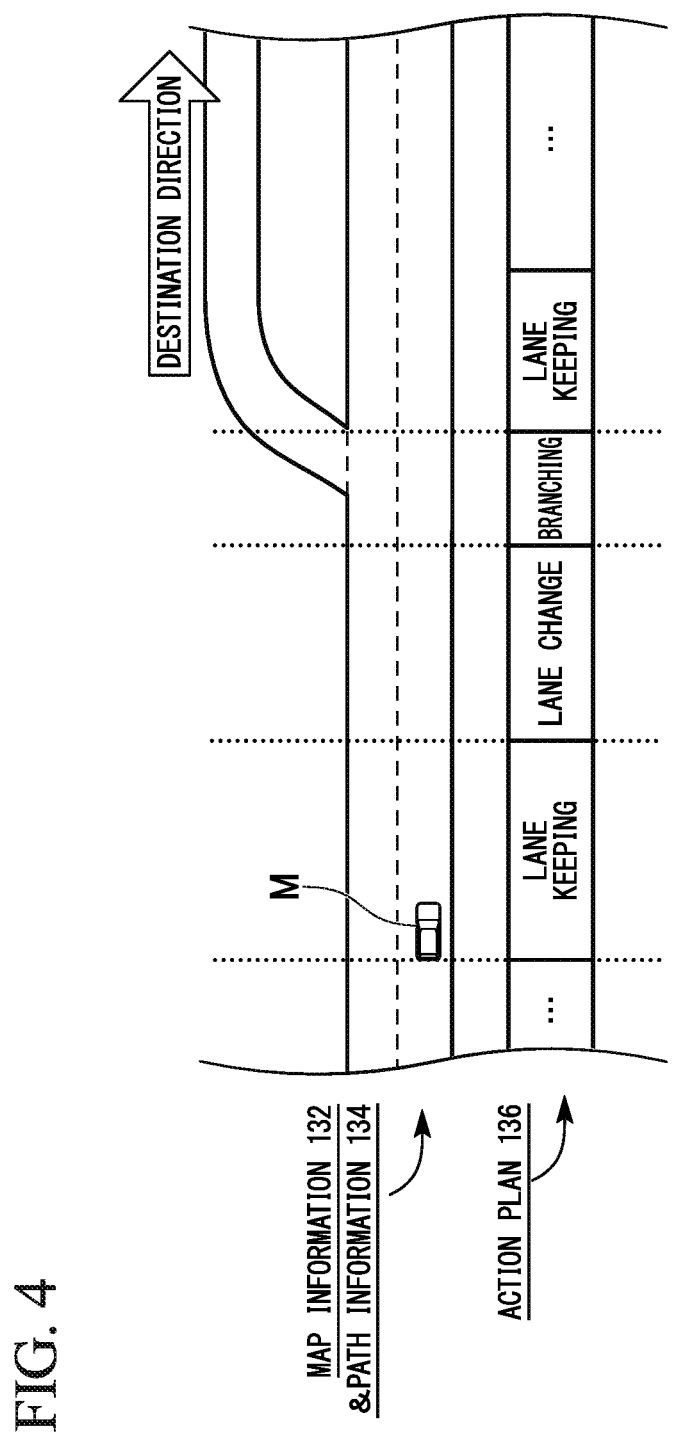
FIG. 4 is a diagram showing an example of an action plan generated for a certain section.

FIG. 4 is a diagram showing an example of an action plan generated for a certain section. As shown in FIG. 4, the action plan generating unit 106 classifies scenes generated when the vehicle travels along the path to the destination and generates an action plan so that events suitable for individual scenes are executed. Here, the action plan generating unit 106 may dynamically change an action plan according to a condition change of the host vehicle M.

[Lane Change Event]

The lane change control unit 110 performs control when a lane change event included in the action plan generated by the action plan generating unit 106 is executed. The lane change control unit 110 includes, for example, a target position candidate setting unit 111, an other vehicle positional change estimating unit 112, a lane changeable period deriving unit 113, a control plan generating unit 114, and a target position decision unit 115.

(Setting of Target Position Candidate)

The target position candidate setting unit 111 refers to a position of the nearby vehicle detected by the detecting unit DT, first sets a large target area in which lanes are changed, and sets a lane change target position candidate as a relative position with respect to the nearby vehicle that travels in an adjacent lane that is adjacent to a travel lane in which the host vehicle M travels (host vehicle lane) within the target area.

Figure 5:
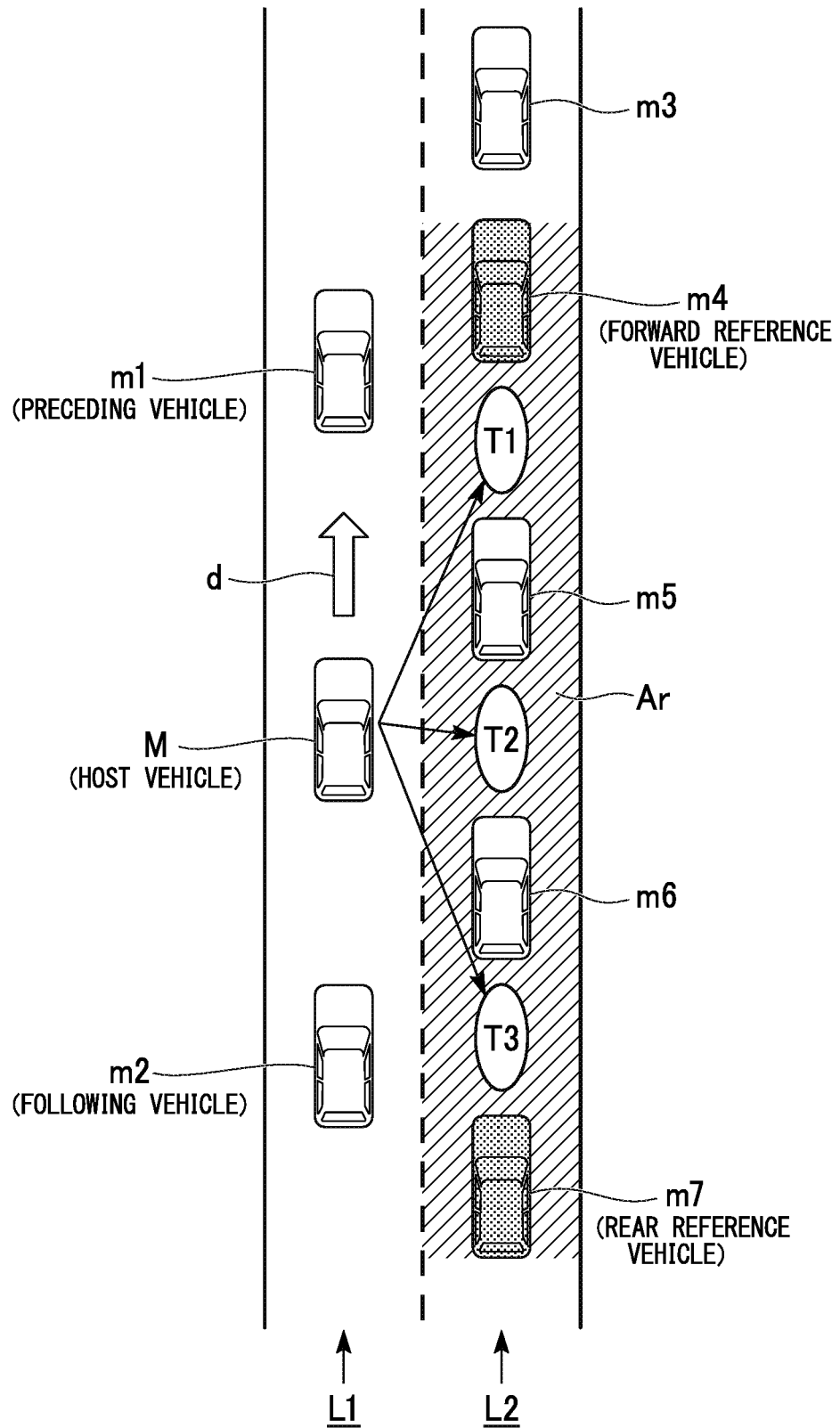
FIG. 5 is a diagram showing a state in which a target position candidate setting unit sets a lane change target position candidate.

FIG. 5 is a diagram showing a state in which the target position candidate setting unit 111 sets a lane change target position candidate. In FIG. 5, m1 to m7 are nearby vehicles, d is a travel direction of each vehicle, L1 is a host vehicle lane, and L2 is an adjacent lane. In addition, Ar is a target area, and T1 to T3 are lane change target position candidates. When the lane change target position candidates are not distinguished, they will be simply referred to as a lane change target position candidate T. In the following description, it is assumed that a change of the lane to an adjacent lane L2 that extends to the right side of the host vehicle lane L is instructed by the action plan.

First, the target position candidate setting unit 111 sets an area that is behind a nearby vehicle m4 (forward reference vehicle) that travels before a nearby vehicle m (preceding vehicle) that travels immediately before the host vehicle M in the host vehicle lane L1 among nearby vehicles that travel in the adjacent lane L2 and is closest to the host vehicle M and ahead a nearby vehicle m7 (rear reference vehicle) that travels behind a nearby vehicle m2 (following vehicle) that travels immediately behind the host vehicle M in the host vehicle lane L1 among nearby vehicles that travel in the adjacent lane L2 and is closest to the host vehicle M as a target area Ar.

Here, a "a nearby vehicle that travels in front of a preceding vehicle" may refer to a nearby vehicle whose front end is in front of a front end of a preceding vehicle, or to a nearby vehicle whose rear end is in front of a rear end of a preceding vehicle, and also may refer to a nearby vehicle whose reference point such as the center of gravity is in front of a reference point, a front end, or a rear end of a preceding vehicle.

On the other hand, a "nearby vehicle that travels behind a following vehicle" may refer to a nearby vehicle whose front end is behind a front end of a following vehicle or to a nearby vehicle whose rear end is behind a rear end of a following vehicle, and also may refer to a nearby vehicle whose reference point such as the center of gravity is behind a reference point, a front end, or a rear end of a following vehicle.

Accordingly, the target position candidate setting unit 111 can prevent the lane change target position candidate T from being set to a position where lane change is considered to be difficult in front of a nearby vehicle that travels in front of a preceding vehicle or behind a nearby vehicle that travels behind a following vehicle. This is because a movement of the host vehicle M for lane change is greatly restricted due to a movement of the preceding vehicle or the following vehicle at such a position. As a result, the target position candidate setting unit 111 can prevent the host vehicle M from being requested to perform an unreasonable movement during lane change.

Thus, the target position candidate setting unit 111 sets the lane change target position candidates T1, T2, and T3 between two nearby vehicles (between m4 and m5, between m5 and m6, and between m6 and m7) in a relationship in which they travel immediately before and immediately behind (in a relationship in which there is no nearby vehicle therebetween) among the nearby vehicles m4 to m7 that travel in the target area Ar. Therefore, the number of lane change target position candidates T varies according to the number of nearby vehicles that travel in the target area Ar in the adjacent lane 12. When the number of nearby vehicles that travel in the target area Ar is n, n−1 lane change target position candidates T are set.

Therefore, the target position candidate setting unit 111 sets a plurality of lane change destination candidates according to a nearby vehicle distribution, and can increase the degree of freedom of lane change control. As a result, it is possible to set an optimal lane change target position T # later.

Figure 6:
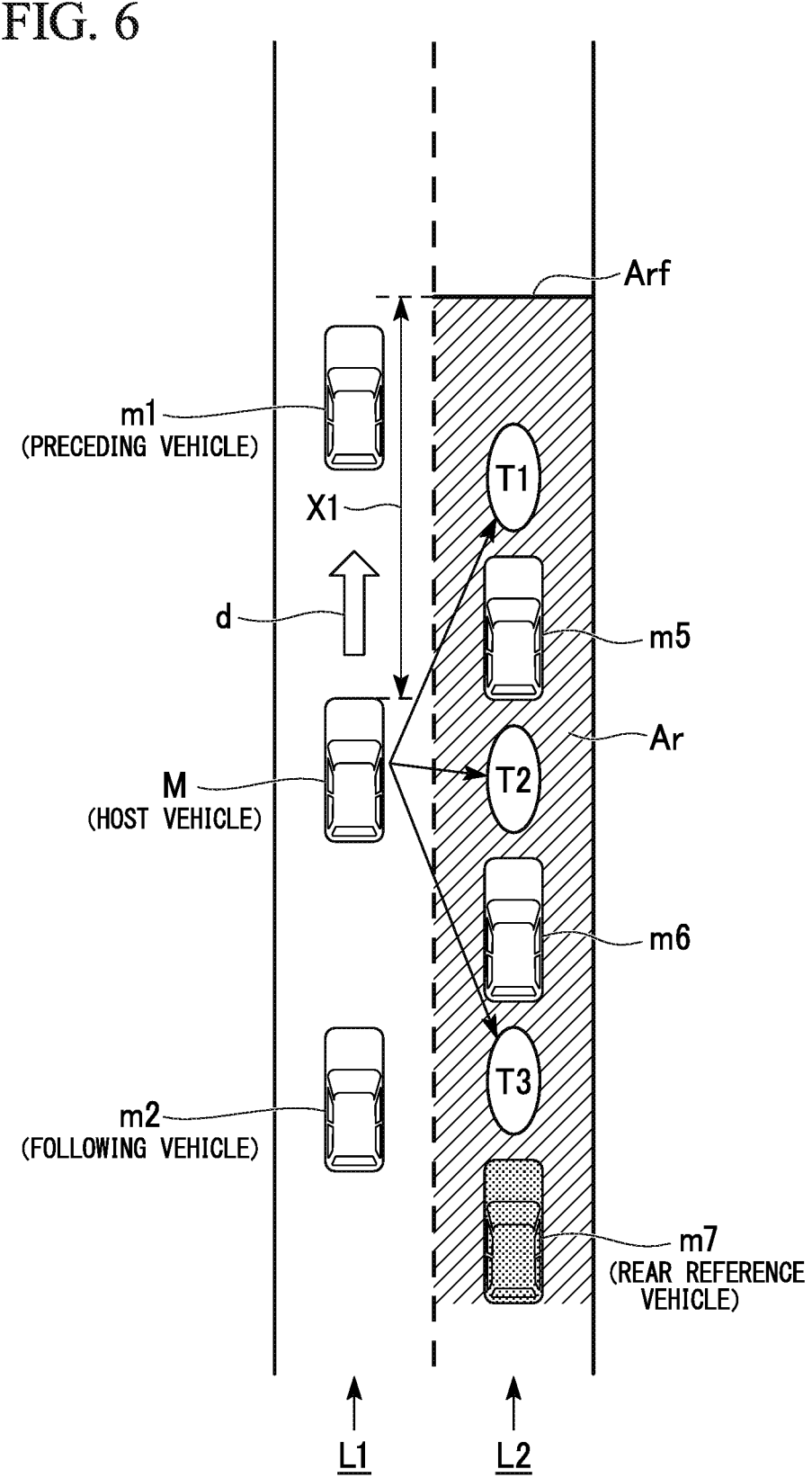
FIG. 6 is a diagram for describing a process performed by the target position candidate setting unit when a forward reference vehicle is not detected.

Here, the case in which one of a forward reference vehicle, a rear reference vehicle, a preceding vehicle, and a following vehicle is not detected by the detecting unit DT is also assumed. This will be described below. FIG. 6 is a diagram for describing a process performed by the target position candidate setting unit 111 when a forward reference vehicle is not detected. As shown in FIG. 6, when the forward reference vehicle is not detected (when there is no nearby vehicle before a preceding vehicle), the target position candidate setting unit 111 decides, for example, a point at a predetermined distance X1 forward from the front end of the host vehicle M as a front side boundary Arf of the target area Ar. The predetermined distance X1 is set to, for example, the distance at which a nearby vehicle in front of the host vehicle M can be detected by the finder 20, the radar 30, the camera 40, or the like. In this case, the target position candidate setting unit 111 may set the lane change target position candidate T1 not only between two nearby vehicles in a relationship in which they travel immediately before and immediately behind but also between the front side boundary Arf of the target area Ar and the nearby vehicle m5 that travels foremost in the target area Ar.

Figure 7:
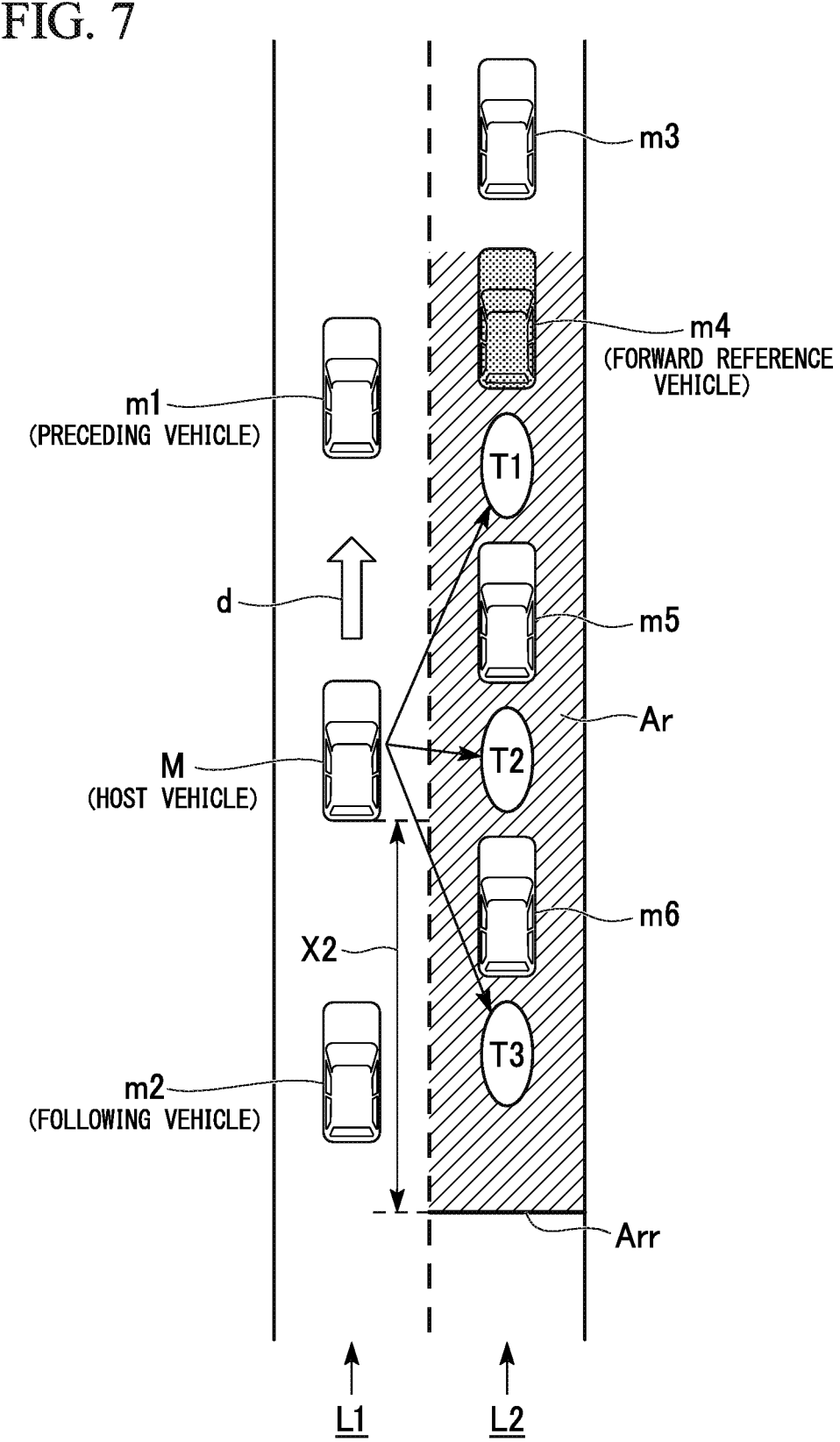
FIG. 7 is a diagram for describing a process performed by the target position candidate setting unit when a rear reference vehicle is not detected.

FIG. 7 is a diagram for describing a process performed by the target position candidate setting unit 111 when a rear reference vehicle is not detected. As shown in FIG. 7, when the rear reference vehicle is not detected (when there is no nearby vehicle behind the following vehicle), the target position candidate setting unit 111 decides, for example, a point of a predetermined distance X2 rearward from the rear end of the host vehicle M as a rear side boundary Arr of the target area Ar. The predetermined distance X2 is set to, for example, a distance at which a nearby vehicle behind the host vehicle M can be detected by the finder 20, the radar 30, the camera 40, or the like. In this case, the target position candidate setting unit 111 may set the lane change target position candidate T3 not only between two nearby vehicles in a relationship in which they travel immediately before and immediately behind but also between the rear side boundary Arr of the target area Ar and the nearby vehicle m6 that travels rearmost in the target area Ar.

Figure 8:
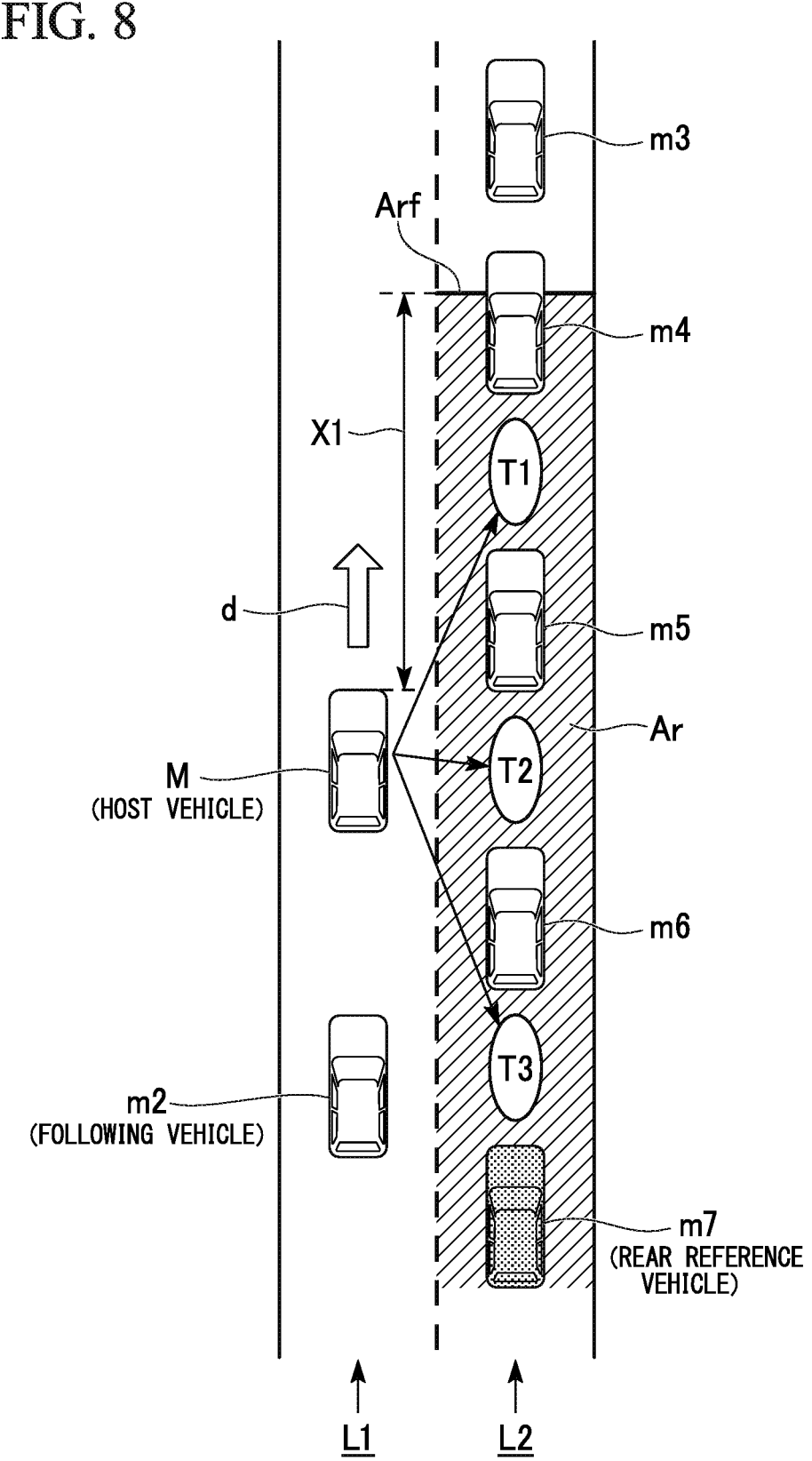
FIG. 8 is a diagram for describing a process performed by the target position candidate setting unit when a preceding vehicle is not detected.

FIG. 8 is a diagram for describing a process performed by the target position candidate setting unit 111 when a preceding vehicle is not detected. As shown in FIG. 8, when the preceding vehicle is not detected (when there is no nearby vehicle within a detection range of the detecting unit DT in front of the host vehicle M), the target position candidate setting unit 111 decides, for example, a point of the predetermined distance X1 forward from the front end of the host vehicle M as the front side boundary Arf of the target area Ar.

Figure 9:
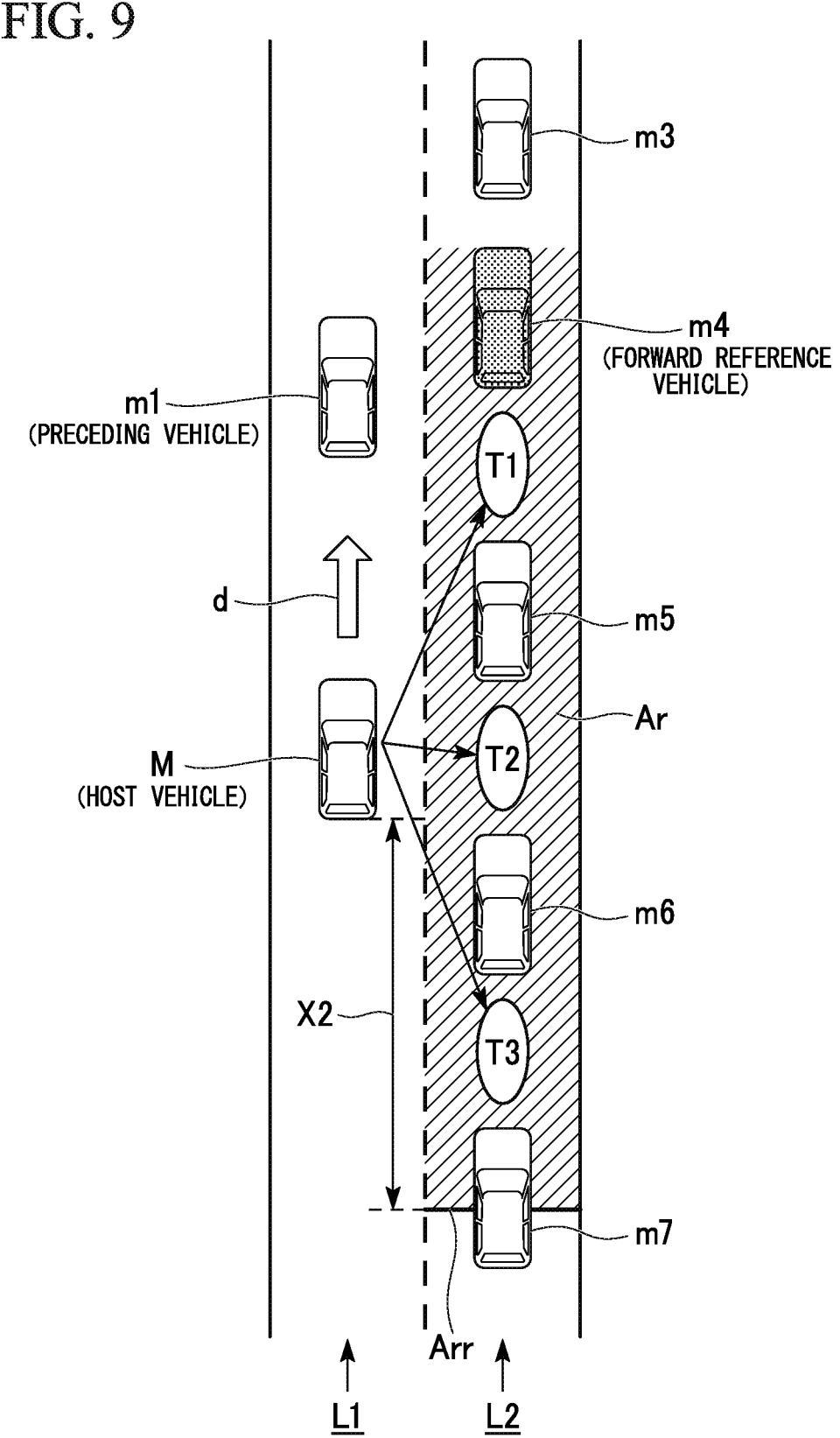
FIG. 9 is a diagram for describing a process performed by the target position candidate setting unit when a following vehicle is not detected.

FIG. 9 is a diagram for describing a process performed by the target position candidate setting unit 111 when a following vehicle is not detected. As shown in FIG. 9, when the following vehicle is not detected (when there is no nearby vehicle within a detection range of the detecting unit DT behind the host vehicle M), the target position candidate setting unit 111 decides, for example, a point of the predetermined distance X2 rearward from the rear end of the host vehicle M as the rear side boundary Arr of the target area Ar.

Here, while it has been defined that the forward reference vehicle and the rear reference vehicle are included in the target area Ar for convenience in the above description, it may be defined that they are not included in the target area Ar for processing. In this case, the target position candidate setting unit 111 may set the lane change target position candidate T not only between two nearby vehicles in a relationship in which they travel immediately before and immediately behind (in a relationship in which there is no nearby vehicle therebetween) but also between the front side boundary Arf of the target area Ar and a nearby vehicle immediately therebehind and between the rear side boundary Arr of the target area Ar and a nearby vehicle immediately therebefore.

Figure 10:
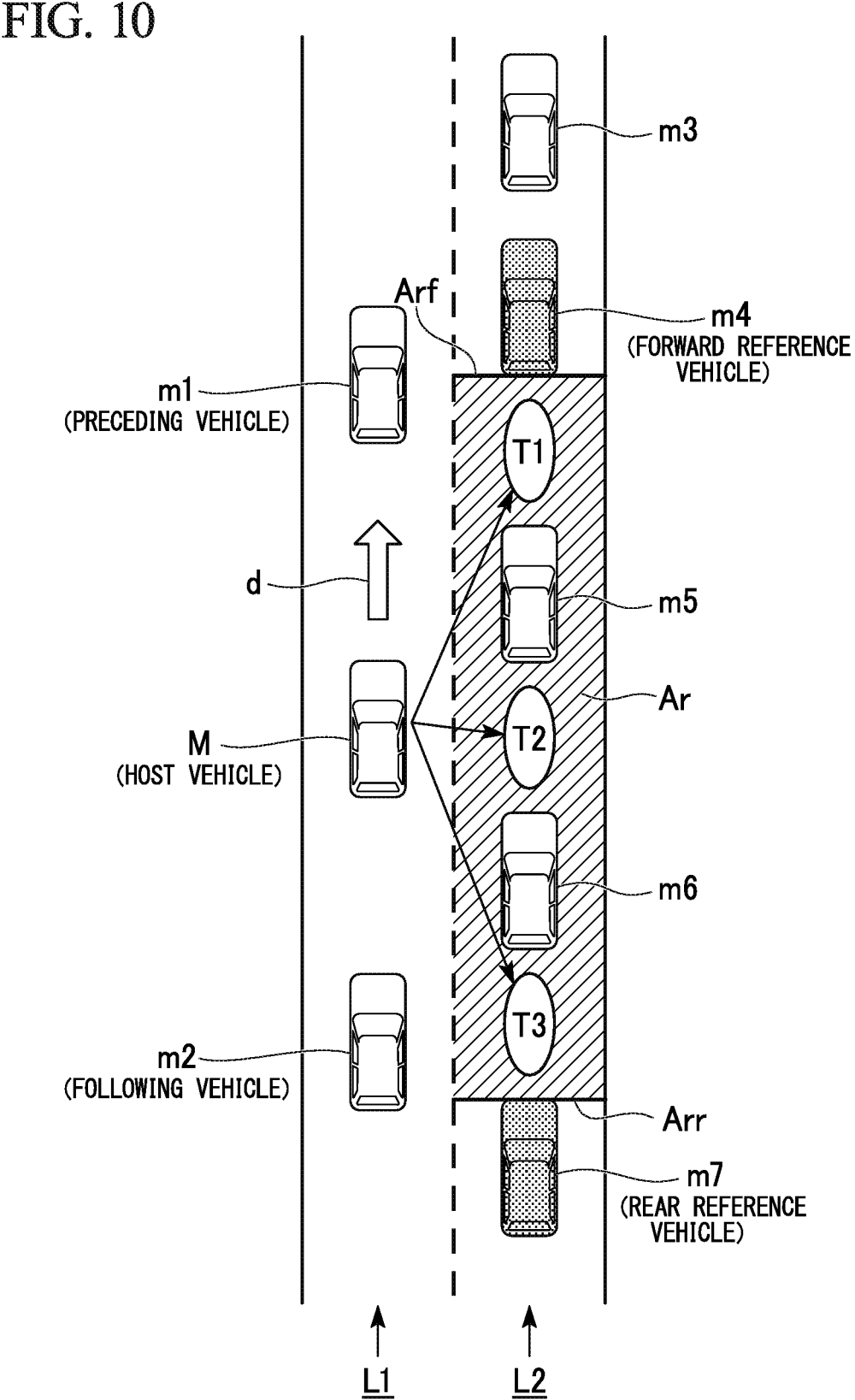
FIG. 10 is a diagram for describing a process performed by the target position candidate setting unit when it is defined that a forward reference vehicle and a rear reference vehicle are not included in a target area.

FIG. 10 is a diagram for describing a process performed by the target position candidate setting unit 111 when it is defined that the forward reference vehicle and the rear reference vehicle are not included in the target area Ar. Here, a process of setting the lane change target position candidate T is different from that in the case shown in FIG. 5, but the result is the same, and these processes are in an equivalent relationship.

The other vehicle positional change estimating unit 112 selects nearby vehicles (three nearby vehicles in the following example) having a high possibility of interfering with lane change among nearby vehicles detected by the detecting unit DT and estimates a future positional change of the selected vehicles. The nearby vehicles having a high possibility of interfering with lane change will be referred to below as monitoring target vehicles mA, mB, and mC.

Figure 11:
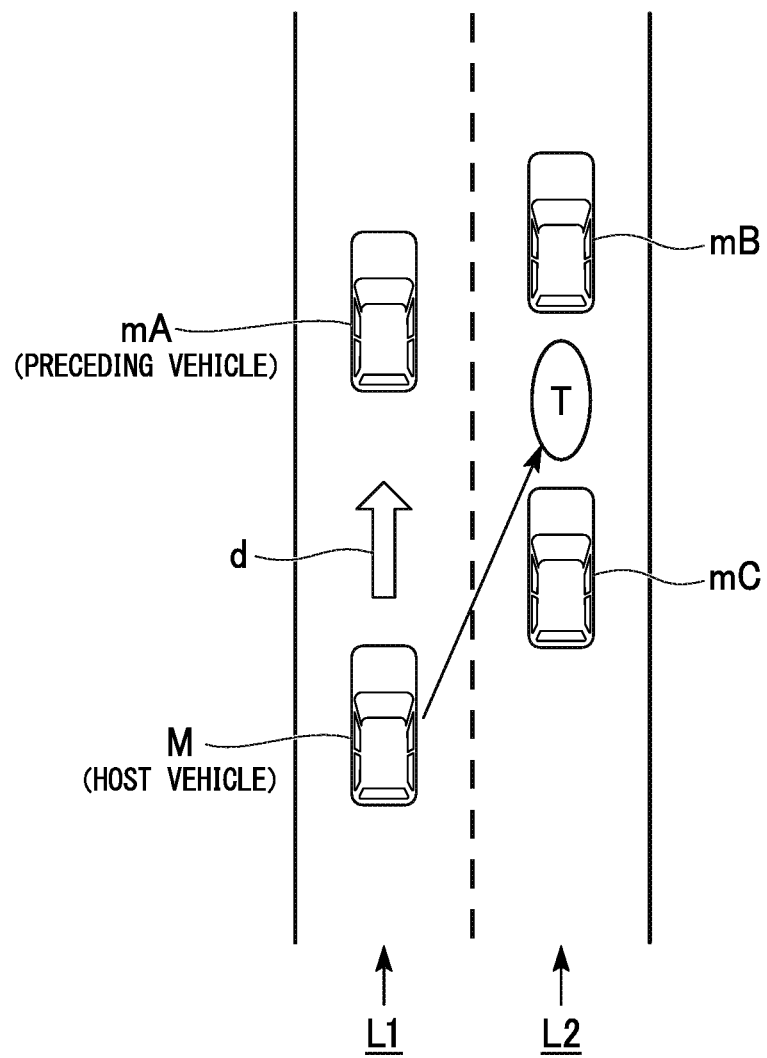
FIG. 11 is a diagram showing positional relations of monitoring target vehicles and a host vehicle with a lane change target position candidate.

FIG. 11 is a diagram showing positional relations of monitoring target vehicles and a host vehicle with the lane change target position candidate T. The monitoring target vehicle mA is a preceding vehicle to the host vehicle M. In addition, the monitoring target vehicle mB is a nearby vehicle that travels immediately before the lane change target position candidate T, and the monitoring target vehicle mC is a nearby vehicle that travels immediately behind the lane change target position candidate T.

The lane changeable period deriving unit 113 derives a lane changeable period P for the lane change target position candidate T on the basis of the positional changes of the monitoring target vehicles mA, mB, and mC estimated by the other vehicle positional change estimating unit 112. A process performed by the lane changeable period deriving unit 113 will be described below in detail.

The control plan generating unit 114 generates a control plan for lane change for each lane change target position candidate T set by the target position candidate setting unit 111 on the basis of the positional changes of the monitoring target vehicles mA, mB, and mC estimated by the other vehicle positional change estimating unit 112.

The target position decision unit 115 decides the lane change target position T # on the basis of a control plan generated by the control plan generating unit 114 for each lane change target position candidate T set by the target position candidate setting unit 111.

Figure 12:
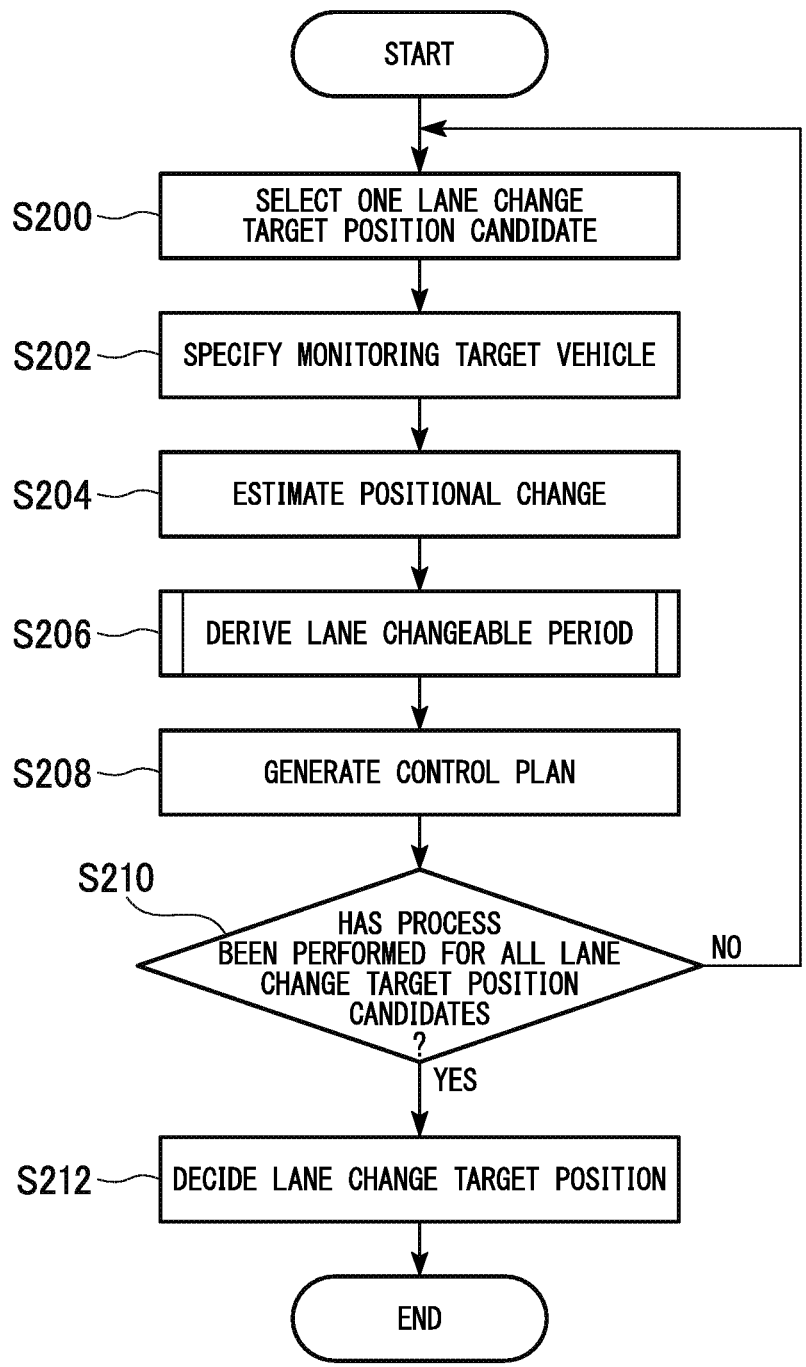
FIG. 12 is a flowchart showing an example of a flow of a process of deciding a lane change target position.

A process for deciding a lane change target position will be described below with reference to a flowchart. FIG. 12 is a flowchart showing an example of a flow of a process of deciding a lane change target position.

First, the target position candidate setting unit 111 selects one lane change target position candidate T (Step S200). Next, the other vehicle positional change estimating unit 112 specifies the monitoring target vehicles mA, mB, and mC corresponding to the lane change target position candidate T (Step S202; refer to FIG. 11).

Next, the other vehicle positional change estimating unit 112 estimates future positional changes of the monitoring target vehicles mA, mB, and mC (Step S204).

The future positional change can be estimated on the basis of, for example, a constant speed model assuming that a vehicle travels while maintaining a current speed, a constant acceleration model assuming that a vehicle travels while maintaining a current acceleration, and other various models. In addition, the other vehicle positional change estimating unit 112 may estimate a positional change in consideration of a steering angle of a monitoring target vehicle or estimate a positional change on the assumption that a vehicle travels while maintaining a current travel lane without consideration of a steering angle. In the following description, a positional change is estimated on the assumption that the monitoring target vehicle travels while maintaining a current speed and maintaining a travel lane.

Next, the lane changeable period deriving unit 113 derives the lane changeable period P (Step S206). This process will be described in detail with reference to another flowchart. First, the principle that is the basis of the process performed by the lane changeable period deriving unit 113 will be described.

First, the relationships (position distribution) between the host vehicle M and the monitoring target vehicles mA, mB, and mC are classified into, for example, six patterns, as will be shown below. In the following, the vehicle shown on the left side is a vehicle that travels in front. Patterns (a) and (b) indicate examples in which a vehicle changes lanes without a change in a relative position with respect to a nearby vehicle. A pattern (c) indicates an example in which a vehicle changes lanes at a relative position that is behind a nearby vehicle (relatively decelerates). Patterns (d), (e), and (f) indicate examples in which a vehicle changes lanes at a relative position that is ahead of a nearby vehicle (relatively accelerates).

Figure 13:
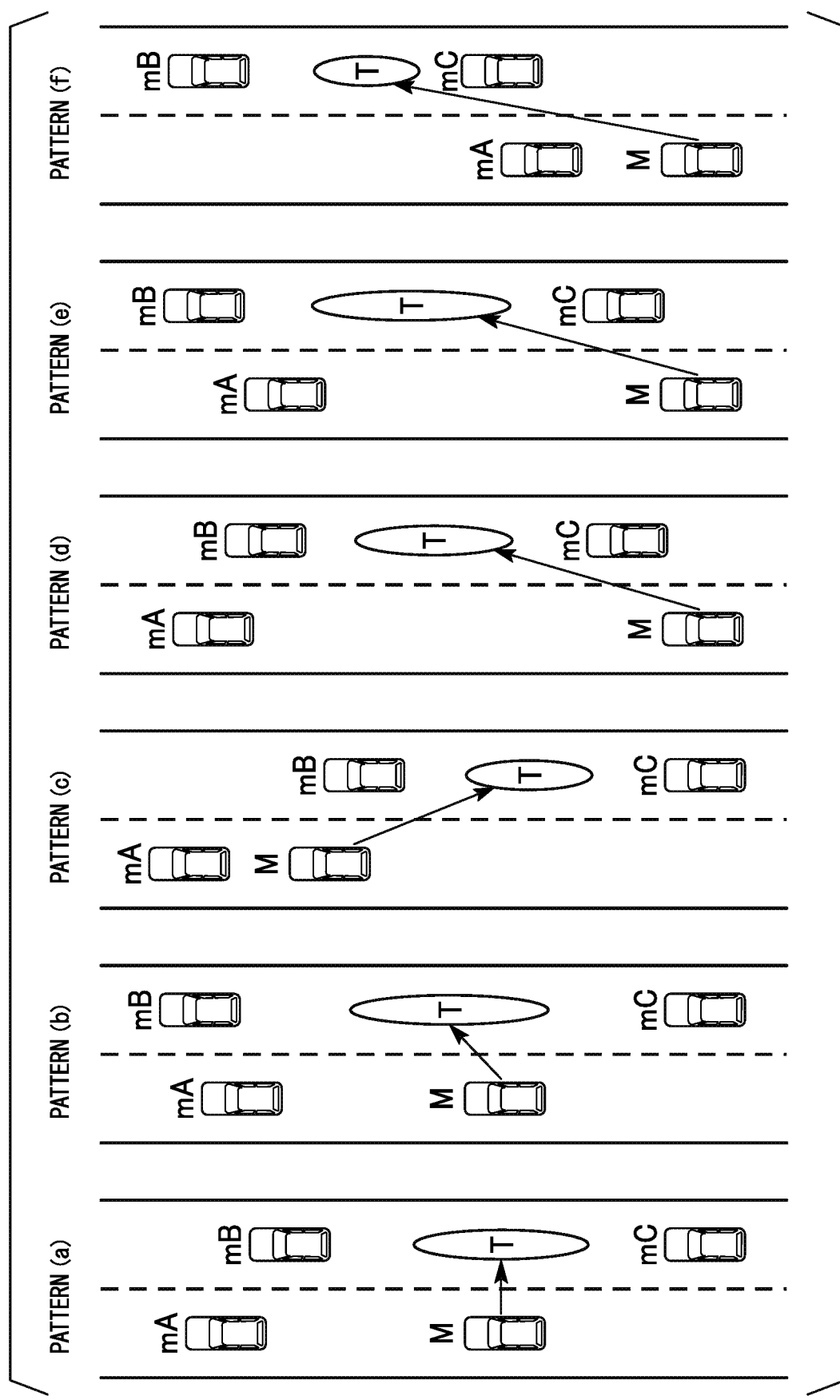
FIG. 13 is a diagram showing patterns obtained by classifying positional relations between a host vehicle and monitoring target vehicles.

Pattern (a): mA-mB-M-mC
Pattern (b): mB-mA-M-mC
Pattern (c): mA-M-mB-mC
Pattern (d): mA-mB-mC-M
Pattern (e): mB-mA-mC-M
Pattern (f): mB-mC-mA-M FIG. 13 is a diagram showing patterns obtained by classifying positional relations between a host vehicle and monitoring target vehicles.

Here, a pattern (f) is set as a reference example because it is on the basis of the lane change target position candidate T that is not set by the target position candidate setting unit 111 in the first embodiment.

Regarding the patterns (a) to (f), the positional changes of the monitoring target vehicles mA, mB, and mC are further classified on the basis of speeds of the monitoring target vehicles. FIG. 14 to FIG. 19 are diagrams showing patterns obtained by classifying positional changes of monitoring target vehicles for the patterns (a) to (f). In FIG. 14 to FIG. 19, the vertical axis represents a displacement in the travel direction based on the host vehicle M and the horizontal axis represents the elapsed time. In addition, in FIG. 14 to FIG. 19, an occupiable area after lane change indicates a displacement area in which the host vehicle M can present when the monitoring target vehicle continues to travel with the same trend after lane change. For example, in FIG. 14, the relation of "speed: mB>mA>mC" indicates that the lane changeable area is below a displacement of the monitoring target vehicle mA, that is, before lane change is performed, the host vehicle M is restricted so that it does not travel before the monitoring target vehicle mA, but after the lane change is performed, there is no problem even if the host vehicle M travels before the monitoring target vehicle mA. The occupiable area after lane change is used for a process of the control plan generating unit 114.

Figure 14:
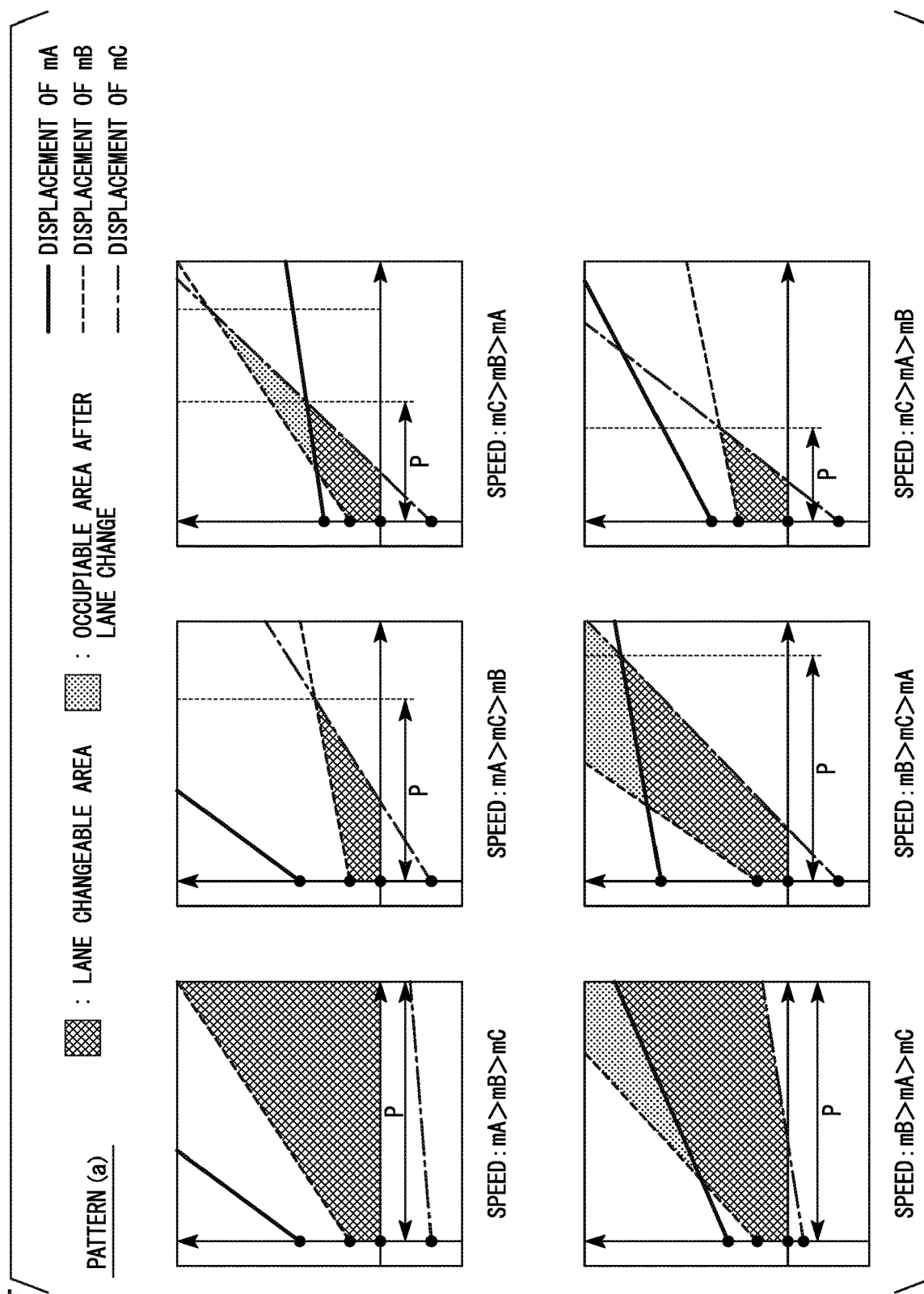
FIG. 14 is a diagram showing patterns obtained by classifying positional changes in monitoring target vehicles in a pattern (a).
Figure 15:
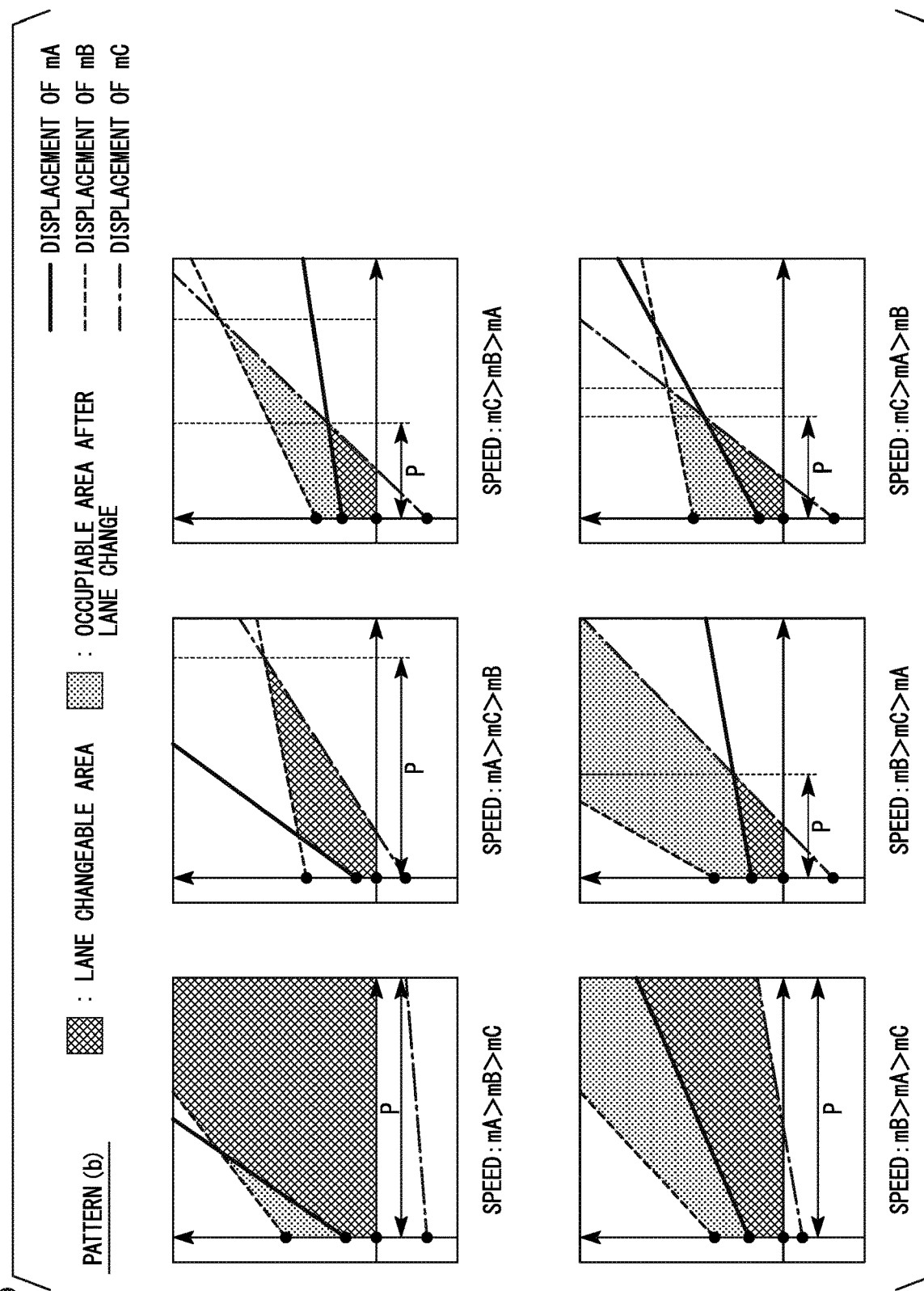
FIG. 15 is a diagram showing patterns obtained by classifying positional changes in monitoring target vehicles in a pattern (b).

FIG. 14 is a diagram showing patterns obtained by classifying positional changes in monitoring target vehicles in the pattern (a). In addition, FIG. 15 is a diagram showing patterns obtained by classifying positional changes in monitoring target vehicles in the pattern (b). The lane changeable period P in the patterns (a) and (b) are defined as follows (hereinafter referred to as a "monitoring target vehicle").

Start time: any time.
End time: the earlier time between a time at which mC catches up with mA and a time at which mC catches up with mB.

Figure 16:
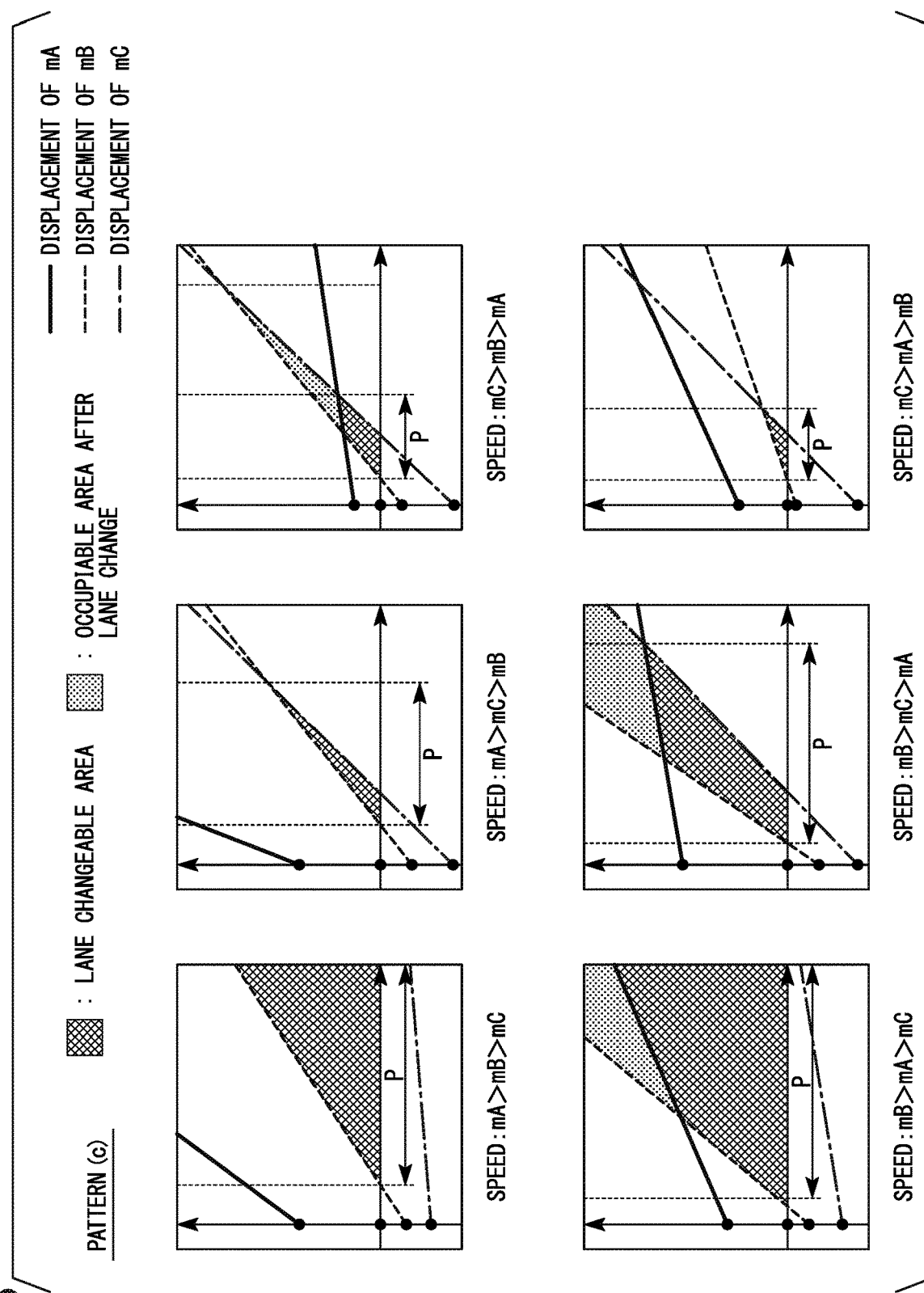
FIG. 16 is a diagram showing patterns obtained by classifying positional changes in monitoring target vehicles in a pattern (c).

FIG. 16 is a diagram showing patterns obtained by classifying positional changes in monitoring target vehicles in the pattern (c). The lane changeable period P in the pattern (c) is defined as follows.

Start time: a time at which mB overtakes the host vehicle M.
End time: the earlier time between a time at which mC catches up with mA and a time at which mC catches up with mB.

FIG. 17 is a diagram showing patterns obtained by classifying positional changes in monitoring target vehicles in the pattern (d). In addition, FIG. 18 is a diagram showing patterns obtained by classifying positional changes in monitoring target vehicles in the pattern (e). The lane changeable period P in the patterns (d) and (e) is defined as follows (hereinafter referred to as a "monitoring target vehicle").

Start time: a time at which the host vehicle M overtakes mC.
End time: the earlier time between a time at which mC catches up with mA and a time at which mC catches up with mB.

Figure 19:
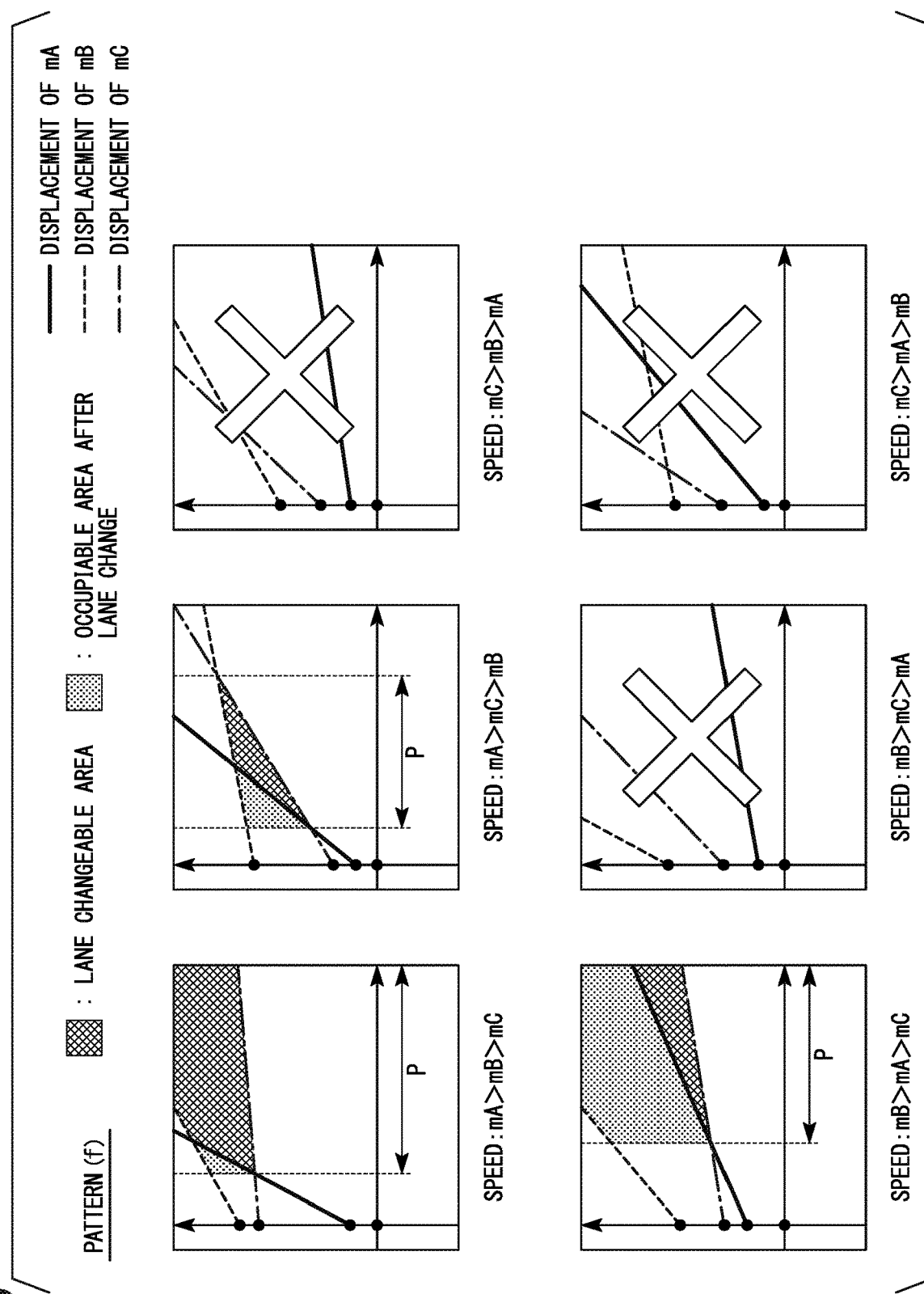
FIG. 19 is a diagram showing patterns obtained by classifying positional changes in monitoring target vehicles in a pattern (f).

FIG. 19 is a diagram showing patterns obtained by classifying positional changes in monitoring target vehicles in the pattern (f). The lane changeable period P in the pattern (f) is defined as follows.

Start time: a time at which mA overtakes mC.
End time: a time at which mC catches up with mB (mC catching up with mA is not considered due to restriction of a start time).

Here, in the pattern (f), when the speed satisfies the relation of mC>mB>mA, mB>mC>mA, or mC>mA>mB, lane change is not possible.

Figure 20:
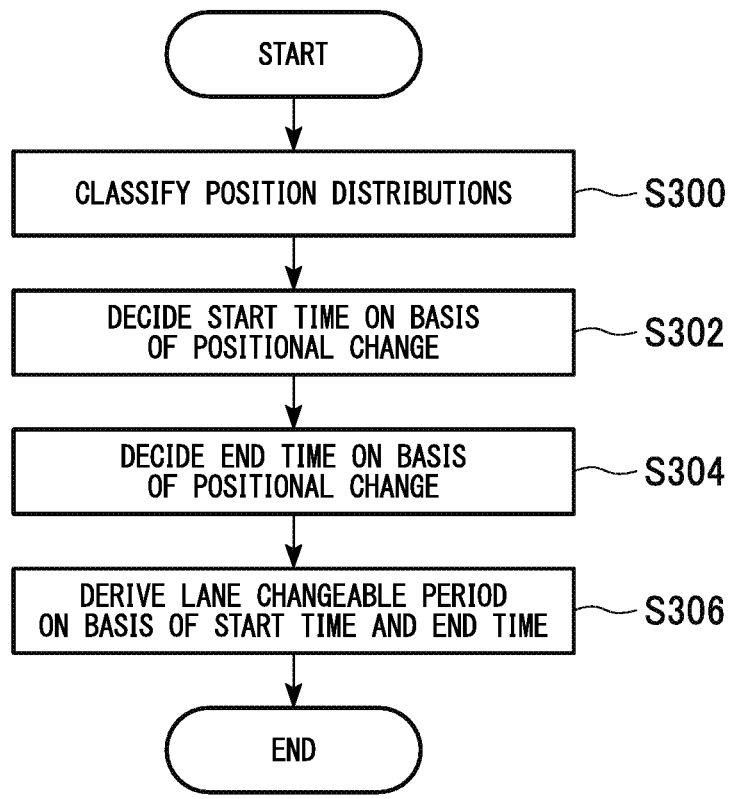
FIG. 20 is a flowchart showing an example of a flow of a process performed by a lane changeable period deriving unit.

FIG. 20 is a flowchart showing an example of a flow of a process performed by the lane changeable period deriving unit 113. The process of the flowchart corresponds to the process of Step S206 in FIG. 12.

First, the lane changeable period deriving unit 113 classifies position distributions between the host vehicle M and the monitoring target vehicles mA, mB, and mC (Step S300). Next, the lane changeable period deriving unit 113 decides a start time of a lane changeable period on the basis of the positional changes of the monitoring target vehicles mA, mB, and mC estimated by the other vehicle positional change estimating unit 112 (Step S302).

Here, as described above, in order to decide a lane change start time, there are elements such as "a time at which the monitoring target vehicle mB overtakes the host vehicle M," and "a time at which the host vehicle M overtakes the monitoring target vehicle mC," and in order to address this, an assumption on acceleration and deceleration of the host vehicle M is necessary. In this regard, for example, for deceleration, the lane changeable period deriving unit 113 decelerates a current speed of the host vehicle M by a predetermined percentage (for example, about 20%), derives a speed change curve in a range in which the host vehicle M does not suddenly decelerate, and decides "a time at which the monitoring target vehicle mB overtakes the host vehicle M" according to the positional change of the monitoring target vehicle mB. In addition, for accelerating, the lane changeable period deriving unit 113 derives a speed change curve using a legal speed as an upper limit in a range in which the host vehicle M does not suddenly accelerate from a current speed, and decides "a time at which the host vehicle M overtakes monitoring target vehicle mC" according to the positional change of the monitoring target vehicle mC.

Next, the lane changeable period deriving unit 113 decides an end time of a lane changeable period on the basis of the positional changes of the monitoring target vehicles mA, mB, and mC estimated by the other vehicle positional change estimating unit 112 (Step S304). Then, the lane changeable period deriving unit 113 derives a lane changeable period on the basis of the start time decided in Step S302 and the end time decided in Step S304 (Step S306).

Returning to FIG. 12, the process of the flowchart will be described. The control plan generating unit 114 generates a control plan for the lane change target position candidate T from which the lane changeable period P is derived (Step S208). Then, the lane change control unit 110 determines whether the process of Steps S200 to S208 has been performed for all lane change target position candidates T (Step S210). When the process of Steps S200 to S208 has not been performed for all lane change target position candidates T, the process returns to Step S200, the next lane change target position candidate T is selected, and the process thereafter is performed.

Figure 21:
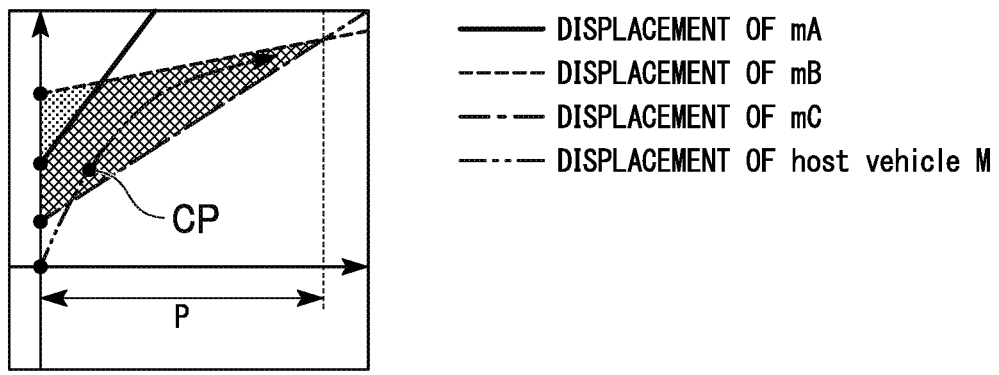
FIG. 21 is a diagram showing an example of a control plan for lane change generated by a control plan generating unit.

FIG. 21 is a diagram showing an example of a control plan for lane change generated by the control plan generating unit 114. The control plan is represented by, for example, a trajectory of displacement in the travel direction of the host vehicle M. The control plan generating unit 114 first obtains a speed restriction of the host vehicle M that can enter a lane changeable area. The speed restriction of the host vehicle M includes that it can enter the lane changeable area within the lane changeable period P. In addition, the speed restriction of the host vehicle M may include that it follows the monitoring target vehicle mB which is a preceding vehicle after the lane change. In this case, at the time at which following travel starts, the host vehicle M may deviate from the lane changeable area and enter the occupiable area after lane change.

Furthermore, when it is necessary to change lanes after the host vehicle M overtakes the monitoring target vehicle mC, the control plan generating unit 114 generates a control plan so that lane change starts at a point (CP in the drawing) at which the displacement of the host vehicle M is sufficiently larger than the displacement of the monitoring target vehicle mC.

According to such control, the lane change control unit 110 can realize smooth lane change control.

When the process of Steps S200 to S208 has been performed for all lane change target position candidates T, the target position decision unit 115 evaluates corresponding control plans, and decides the lane change target position T # (Step S212).

The target position decision unit 115 decides the lane change target position T # in consideration of, for example, safety and efficiency. The target position decision unit 115 refers to the control plans corresponding to the lane change target position candidates T, and preferentially selects a position where an interval with front and rear vehicles during lane change is wide, a position where a speed is close to a legal speed, or a position where an acceleration and deceleration amount necessary for lane change is small as the lane change target position T #. In this manner, one lane change target position T # and the control plan are decided.

[Travel Control]

The travel control unit 120 sets the control mode to the automatic driving mode or the manual driving mode under control of the control switching unit 122 and controls a control target according to the set control mode. The travel control unit 120 reads action plan information 136 generated by the action plan generating unit 106 in the automatic driving mode and controls the control target on the basis of an event included in the read action plan information 136. When the event is a lane change event, the travel control unit 120 decides a control amount (for example, a rotational speed) of the electric motor in the steering device 92 and a control amount (for example, a throttle opening degree and a shift stage of an engine) of the ECU in the travel driving force output device 90 according to the control plan generated by the control plan generating unit 114. The travel control unit 120 outputs information indicating a control amount decided for each event to a corresponding control target. Thus, the control target devices (90, 92, and 94) can control its own device according to the information indicating a control amount input from the travel control unit 120. In addition, the travel control unit 120 appropriately adjusts the decided control amount on the basis of the detection result of the vehicle sensor 60.

In addition, the travel control unit 120 controls a control target on the basis of an operation detection signal output from the operation detection sensor 72 in the manual driving mode. For example, the travel control unit 120 outputs the operation detection signal output from the operation detection sensor 72 to each control target device without change.

The control switching unit 122 switches the control mode of the host vehicle M by the travel control unit 120 from the automatic driving mode to the manual driving mode or from the manual driving mode to the automatic driving mode on the basis of the action plan information 136 generated by the action plan generating unit 106. In addition, the control switching unit 122 switches the control mode of the host vehicle M by the travel control unit 120 from the automatic driving mode to the manual driving mode or from the manual driving mode to the automatic driving mode on the basis of the control mode designation signal input from the selector switch 80. That is, the control mode of the travel control unit 120 can be arbitrarily changed during travel or during stop according to an operation of the driver or the like.

In addition, the control switching unit 122 switches the control mode of the vehicle M by the travel control unit 120 from the automatic driving mode to the manual driving mode on the basis of the operation detection signal input from the operation detection sensor 72. For example, when the operation amount included in the operation detection signal exceeds a threshold value, that is, when the operation device 70 receives an operation with an operation amount that exceeds a threshold value, the control switching unit 122 switches the control mode of the travel control unit 120 from the automatic driving mode to the manual driving mode. For example, when the host vehicle M automatically travels by the travel control unit 120 set in the automatic driving mode, if a steering wheel, an accelerator pedal, or a brake pedal is operated with an operation amount that exceeds a threshold value by the driver, the control switching unit 122 switches the control mode of the travel control unit 120 from the automatic driving mode to the manual driving mode. Therefore, according to an operation performed instantly by the driver when a subject such as a human suddenly jumps into the road and a vehicle in front suddenly stops, the vehicle control device 100 can immediately switch the mode to the manual driving mode without operating the selector switch 80. As a result, the vehicle control device 100 can respond to an operation by the driver in the event of an emergency and can improve the safety during travel.

According to the vehicle control apparatus 100 of the present embodiment described above, the target position candidate setting unit 111 can prevent the lane change target position candidate T from being set to a position where lane change is considered to be difficult in front of a nearby vehicle that travels in front of a preceding vehicle or behind a nearby vehicle that travels behind a following vehicle. As a result, the target position candidate setting unit 111 can prevent the host vehicle M from being requested to perform an unreasonable movement during lane change.

In addition, according to the vehicle control apparatus 100 of the present embodiment, the target position candidate setting unit 111 sets a plurality of lane change destination candidates according to a nearby vehicle distribution, and can increase the degree of freedom of lane change control. As a result, it is possible to set an optimal lane change target position T # later.

In addition, according to the vehicle control apparatus 100 of the present embodiment, the lane changeable period deriving unit 113 derives the lane changeable period P during which lane change is possible to the lane change target position candidate T set as a relative position with respect to a nearby vehicle that travels in the adjacent lane L2 that is adjacent to the host vehicle lane L1 on the basis of the positional change of the nearby vehicle (monitoring target vehicle), and thus can be used for various processes such as generation of a control plan for lane change.

In addition, according to the vehicle control apparatus 100 of the present embodiment, the control plan generating unit 114 derives a speed restriction for changing the lane to the lane change target position T # within the lane changeable period P derived by the lane changeable period deriving unit 113, and generates a control plan under the derived speed restriction. Therefore, it is possible to prevent the occurrence of a situation in which an unrealizable control plan is planned.

In addition, according to the vehicle control apparatus 100 of the present embodiment, the lane changeable period deriving unit 113 derives the lane changeable period P by a different method according to the position distribution between the host vehicle M and the monitoring target vehicles. Therefore, it is possible to derive the lane changeable period P by an appropriate method according to the position distribution between the host vehicle M and the monitoring target vehicle.

Modified Example of First Embodiment

A modified example of the first embodiment will be described below. The vehicle control apparatus 100 according to the modified example of the first embodiment is different from that in the first embodiment in which it is determined whether a lane change target position candidate is a lane change target position target on the basis of the derived lane changeable period, and the lane change target position is decided from among lane change target position candidates decided as the lane change target position target. The difference will be described below on focus.

Figure 22:
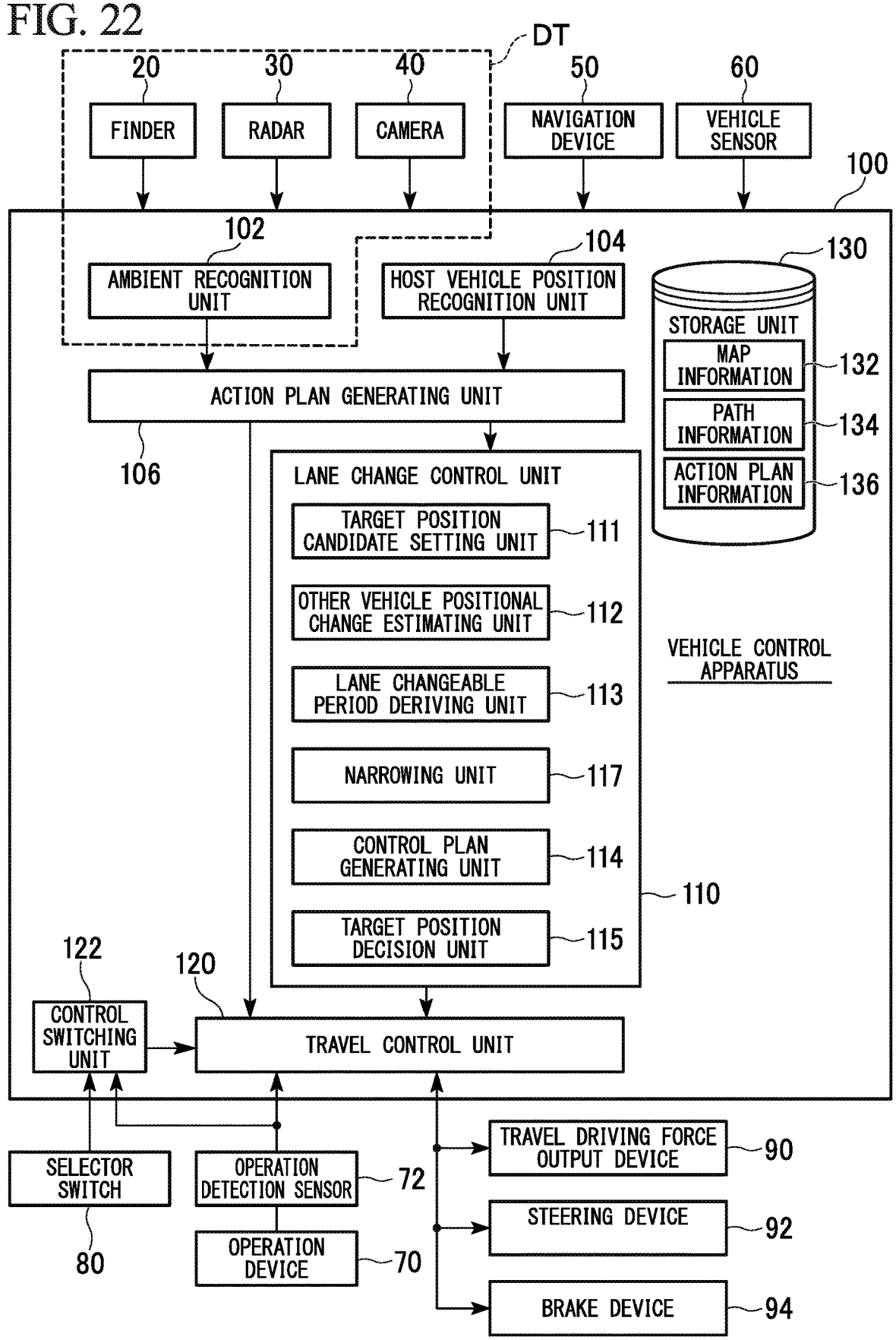
FIG. 22 is a functional block diagram of a host vehicle centered on a vehicle control apparatus according to a modified example of the first embodiment.

FIG. 22 is a functional block diagram of the host vehicle M centered on the vehicle control apparatus 100 according to a modified example of the first embodiment. The vehicle control apparatus 100 according to the modified example of the first embodiment further includes a narrowing unit 117 in addition to the functional configuration of the vehicle control apparatus 100 according to the first embodiment. The narrowing unit 117 decides whether a lane change target position candidate is set as a target decided as a lane change target position on the basis of the lane changeable period derived by the lane changeable period deriving unit 113. The process of the narrowing unit 117 according to the modified example of the first embodiment will be described below in detail.

Figure 23:
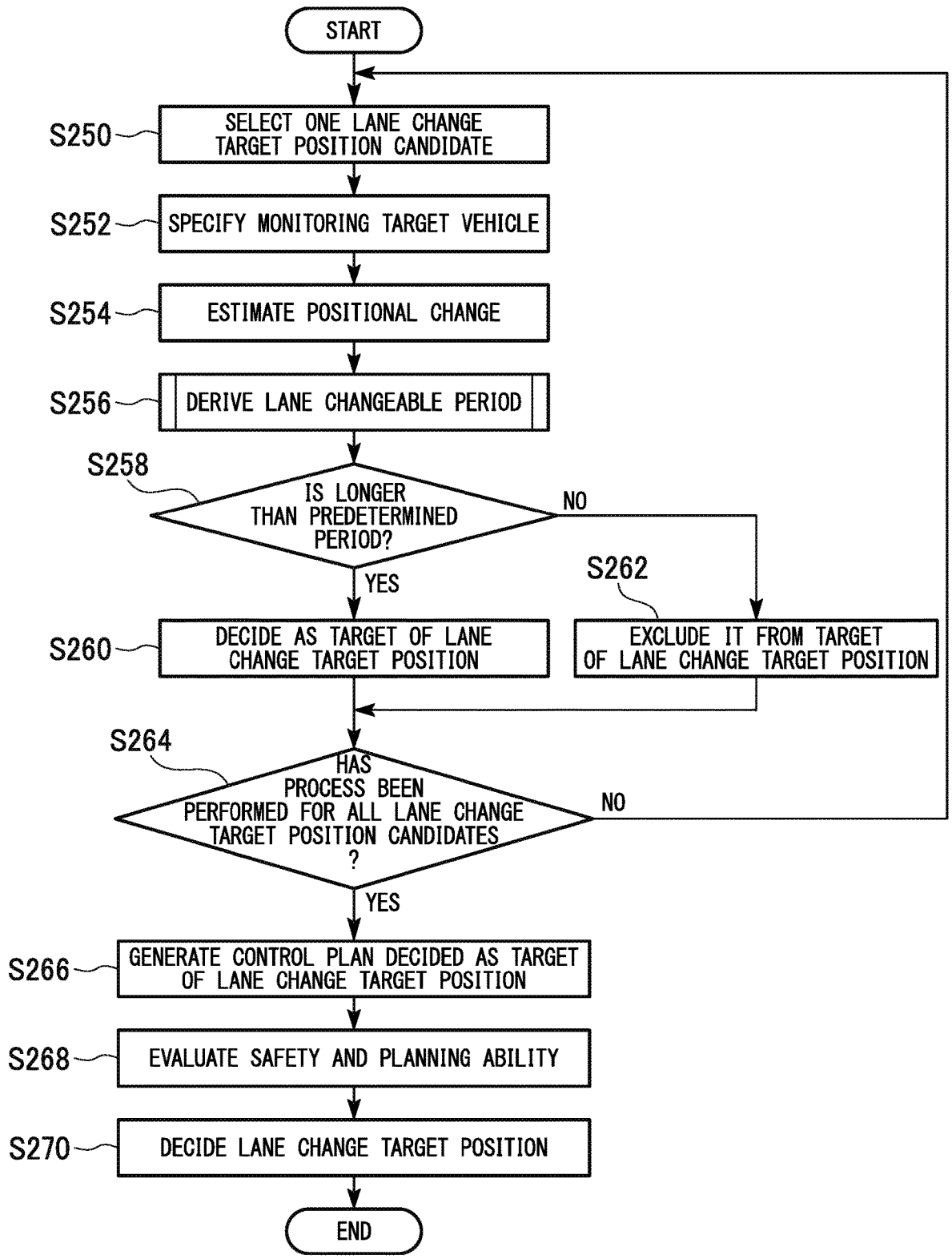
FIG. 23 is a flowchart showing a flow of a process performed by the vehicle control apparatus according to the modified example of the first embodiment.

FIG. 23 is a flowchart showing a flow of a process performed by the vehicle control apparatus 100 according to the modified example of the first embodiment. First, the target position candidate setting unit 111 selects one lane change target position candidate T (Step S250). Next, the other vehicle positional change estimating unit 112 specifies the monitoring target vehicles mA, mB, and mC corresponding to the lane change target position candidate T (Step S252; refer to FIG. 11).

Next, the other vehicle positional change estimating unit 112 estimates future positional changes of the monitoring target vehicles mA, mB, and mC (Step S254). Next, the lane changeable period deriving unit 113 derives the lane changeable period P (Step S256).

Next, the narrowing unit 117 determines whether the lane changeable period P derived in Step S256 is a period longer than a preset predetermined period (Step S258). When the lane changeable period P is a period longer than the preset predetermined period, the narrowing unit 117 decides the lane change target position candidate selected in Step S250 as a target of the lane change target position (Step S260). In this manner, the narrowing unit 117 narrows down previously set lane change target position candidates. When the lane changeable period P is a period equal to or shorter than the preset predetermined period, the narrowing unit 117 decides that the lane change target position candidate selected in Step S250 is excluded from the target of the lane change target position (Step S262).

Next, the narrowing unit 117 determines whether the process of Steps S250 to S262 has been performed for all lane change target position candidates T (Step S264). When the process of Steps S250 to S262 has not been performed for all lane change target position candidates T, the process returns to Step S250, the next lane change target position candidate T is selected, and the process thereafter is performed.

When the process of Steps S250 to S262 has been performed for all lane change target position candidates T, the control plan generating unit 114 generates a control plan for the lane change target position candidate T decided as the target of the lane change target position in Step S260 (Step S266).

Next, the target position decision unit 115 evaluates the corresponding control plan on the basis of safety and efficiency (Step S268). For example, the target position decision unit 115 derives an evaluation value for the control plan and decides the lane change target position T # on the basis of the derived evaluation value. The evaluation value is derived in consideration of, for example, safety and a planning ability.

For example, the target position decision unit 115 selects an optimal control plan on the basis of the evaluation function f in the following Equation (1), $w_1(=(w+1)^{-1})$ and $w_2$ are weighting factors, $e_1$ is a safety index, and $e_2$ is a planning ability index. The safety index is, for example, an evaluation value decided on the basis of the distance between the host vehicle M and front and rear vehicles when the lane is changed to a lane change target position candidate, an interval between trajectory points forming a trajectory (a trajectory along which a host vehicle is assumed to travel) along which a vehicle travels during lane change and a nearby vehicle (object) of the host vehicle M, and the like. In addition, the safety index may be an evaluation value decided on the basis of an acceleration and deceleration, a steering angle, an assumed yaw rate and the like at trajectory points of a trajectory along which a vehicle travels during lane change. For example, when the distance between the host vehicle M and front and rear vehicles (or nearby vehicles) is longer, and when a change amount of acceleration and deceleration or steering angle is smaller, the safety index is evaluated as being higher. In addition, regarding the safety index, when a speed of the host vehicle M during lane change is closer to a legal speed, the safety index may be evaluated as being higher.

The planning ability index is an evaluation value based on the followability to the plan generated by the action plan generating unit 106 and/or the shortness of the trajectory. When the action plan generating unit 106 decides that "travel in a center lane, change the lane to the right, and turn right at an intersection several tens of meters ahead," the host vehicle M is accelerated toward a lane change target position candidate positioned in front of the host vehicle M, and a trajectory along which the lane is changed is determined by the target position decision unit 115 when the planning ability index is low.

When such a trajectory is selected, the host vehicle M suddenly decelerates before the intersection and has difficulty turning right. The planning ability index is evaluated to be lower when a possibility of realization of the plan generated by the action plan generating unit 106 becomes lower.

$$f = w_1 e_1 (w_2 e_2 + 1) \qquad (1)$$

Figure 24:
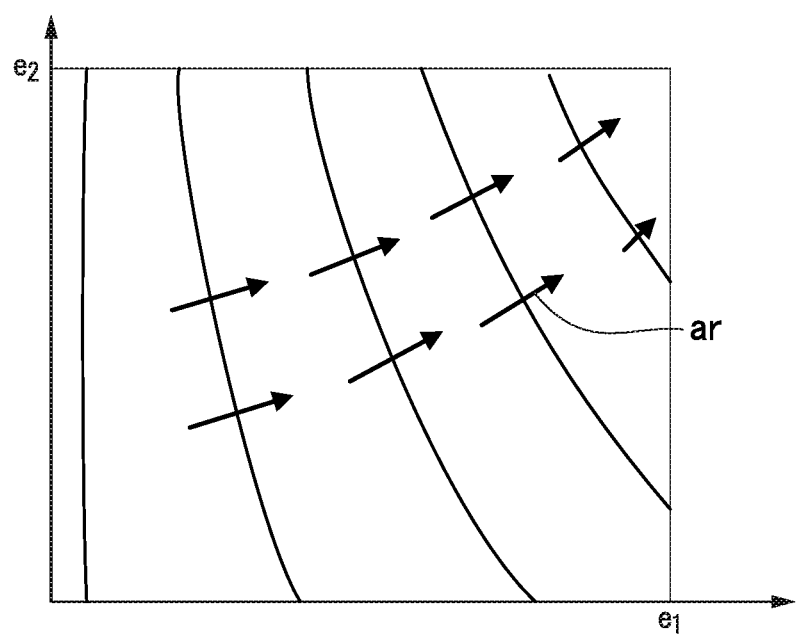
FIG. 24 is a diagram showing an example of a criterion for trajectory determination based on a safety index and a planning ability index.

FIG. 24 is a diagram showing an example of a criterion for trajectory determination based on the safety index and the planning ability index. The vertical axis represents the planning ability and the horizontal axis represents the safety index. The evaluation function f has a gradient in which evaluation rises in the arrow ar direction in the drawing. For example, compared to a simple weighted sum such as f*=$w_1e_l+w_2e_2$, the evaluation function f can lower evaluation of the trajectory with a very low safety index, and exclude the evaluation.

Next, the target position decision unit 115 decides the lane change target position T # from among lane change target position candidates serving as targets of the lane change target position decided in Step S260 on the basis of the evaluation result in Step S268 (Step S270). Therefore, the process of the flowchart ends.

In this manner, the target position decision unit 115 decides the lane change target position on the basis of the safety and planning ability of the trajectory included in the control plan for lane change. As a result, the target position decision unit 115 can select the lane change target position to which the planning ability is added with sufficient consideration of the safety.

Here, when there is no lane change target position candidate serving as a target of the lane change target position, the target position decision unit 115 determines that lane change is not possible. In addition, the target position decision unit 115 may determine that lane change is not possible when the evaluation result of the lane change target position candidate in Step S268 is less than a threshold value. In this case, the target position decision unit 115 may perform a process of resetting a waiting state or a target position.

Here, the narrowing unit 117 may decide lane change target position candidates corresponding to a predetermined number (for example, 3) of lane changeable periods in the order from long lane changeable periods among the lane changeable periods P derived by the lane changeable period deriving unit 113 as targets of the lane change target position.

The above-described predetermined number or the preset predetermined period in Step S258 may be arbitrarily set, and for example, is set according to a processing capacity per unit time of a processor including the lane change control unit 110. For example, when the processing capacity per unit time of a processor including the lane change control unit 110 is low, the vehicle control apparatus 100 reduces the above-described predetermined number and sets the preset predetermined period in Step S258 to be longer. Therefore, it is possible to reduce the number of processes executed within a predetermined time. On the other hand, when the processing capacity per unit time of a processor including the lane change control unit 110 is high, the vehicle control apparatus 100 increases the above-described predetermined number and sets the preset predetermined period in Step S258 to be shorter. Therefore, it is possible to process more target position candidates within a predetermined time. In this case, the vehicle control apparatus 100 derives evaluation values for more lane change target position candidates and can decide the lane change target position T # on the basis of the derived score, and can select a more optimal lane change target position.

In addition, the narrowing unit 117 may decide a lane change target position corresponding to the longest lane changeable period P among the lane changeable periods P derived by the lane changeable period deriving unit 113 as the target of the lane change target position. In this case, in the process of the flowchart described above, the process of Steps S258 to Step S262 is omitted, and after the process of Step S264, the narrowing unit 117 derives the longest lane changeable period among all lane changeable periods.

According to the modified example of the vehicle control apparatus 100 of the present embodiment described above, in addition to the functions of the first embodiment, further, it is determined whether a lane changeable period derived is longer than a preset period. When the lane changeable period is longer than a preset period, a lane change target position for the lane changeable period longer than the preset period is decided as the target of the lane change target position. Therefore, it is possible to obtain the same effects as in the first embodiment, and it is also possible to reduce a processing load due to exclusion of process targets.

Second Embodiment

Figure 25:
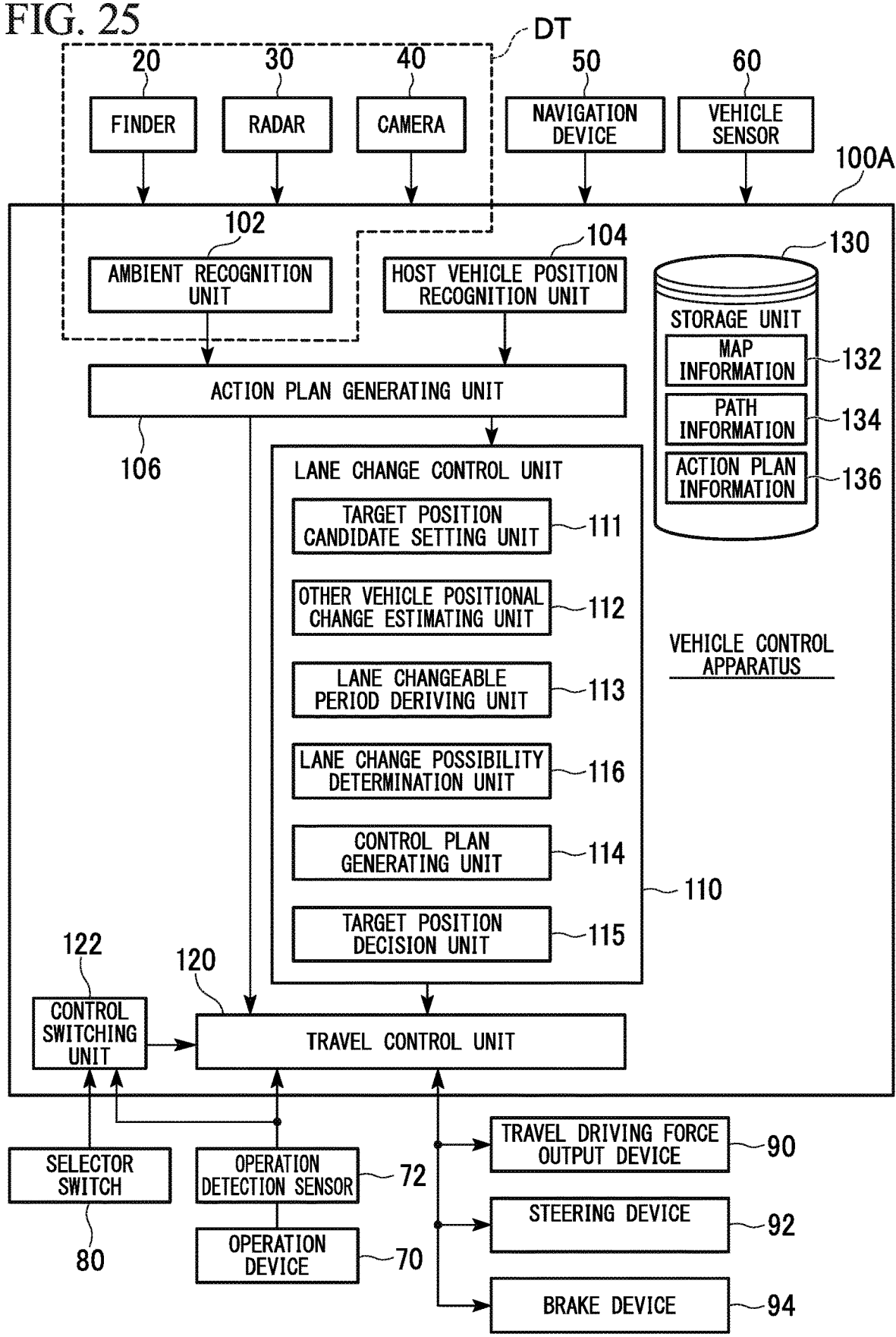
FIG. 25 is a functional block diagram of a host vehicle centered on a vehicle control apparatus according to a second embodiment.

A second embodiment will be described below. FIG. 25 is a functional block diagram of the host vehicle M centered on a vehicle control apparatus 100A according to the second embodiment. The vehicle control apparatus 100A according to the second embodiment is different from that in the first embodiment in that the lane change control unit 110 includes a lane change possibility determination unit 116. The difference will be described below on focus.

Figure 26:
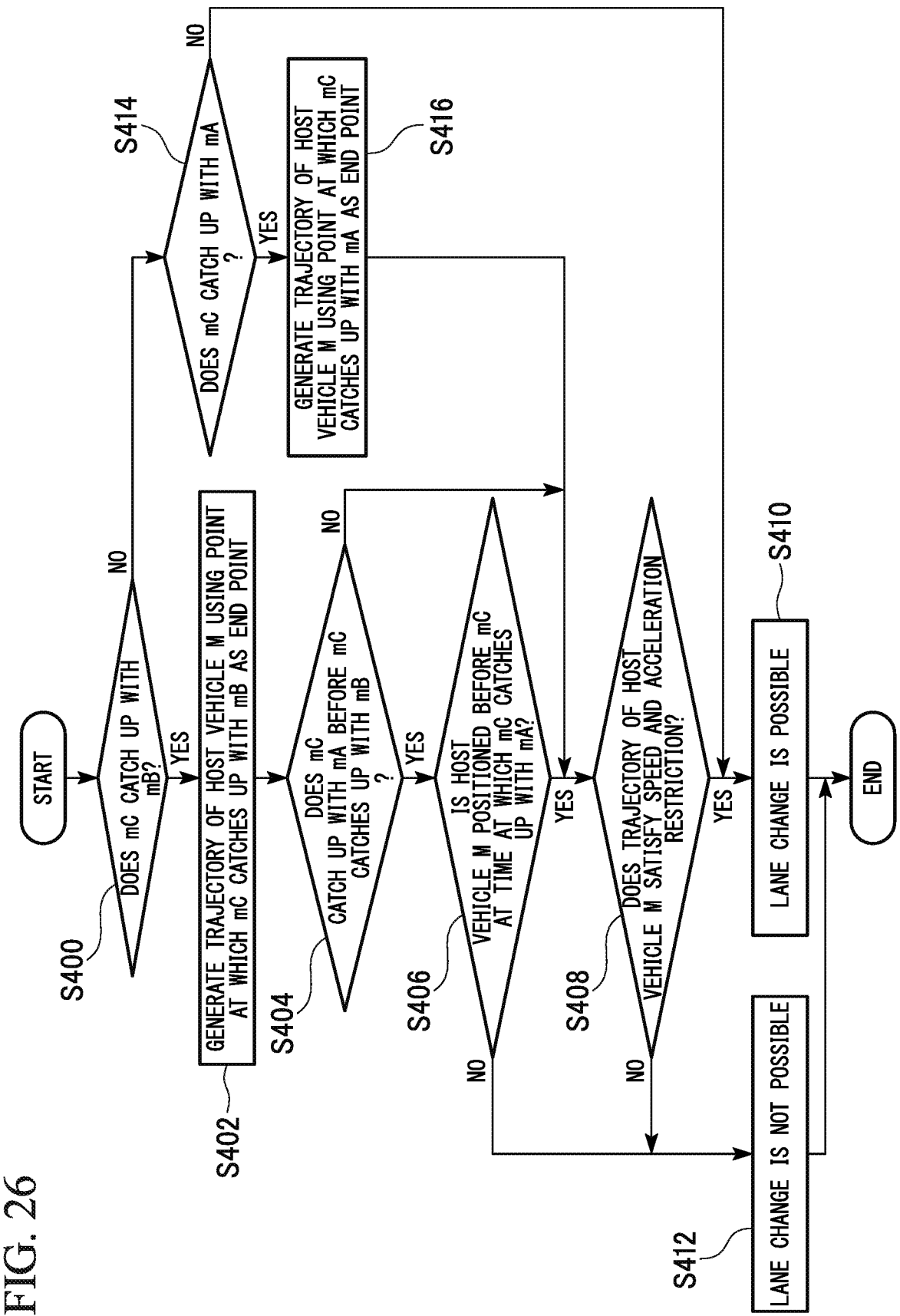
FIG. 26 is a flowchart showing an example of a flow of a process performed by a lane change possibility determination unit according to the second embodiment.

FIG. 26 is a flowchart showing an example of a flow of a process performed by the lane change possibility determination unit 116 according to the second embodiment. First, the lane change possibility determination unit 116 determines whether the monitoring target vehicle mC catches up with mB (Step S400).

When the monitoring target vehicle mC catches up with mB, the lane change possibility determination unit 116 generates a trajectory of displacement of the host vehicle M using a point at which the monitoring target vehicle mC catches up with mB as an end point (Step S402). Next, the lane change possibility determination unit 116 determines whether the monitoring target vehicle mC catches up with mA before the monitoring target vehicle mC catches up with mB (Step S404).

When the monitoring target vehicle mC catches up with mA before the monitoring target vehicle mC catches up with mB (refer to the upper right drawing in FIG. 14), the lane change possibility determination unit 116 determines whether the host vehicle M is positioned before the monitoring target vehicle mC at a time at which the monitoring target vehicle mC catches up with mA (Step S406).

When the host vehicle M is positioned before the monitoring target vehicle mC at a time at which the monitoring target vehicle mC catches up with mA, the lane change possibility determination unit 116 determines whether a trajectory of the host vehicle M satisfies a speed and acceleration restriction (Step S408). For example, the speed and acceleration restriction is defined as within a speed range with an upper limit that is a legal speed and a lower limit that is about 60% of a legal speed and by acceleration and deceleration less than a threshold value set accordingly.

When the trajectory of the host vehicle M satisfies the speed and acceleration restriction, the lane change possibility determination unit 116 determines that lane change is possible (Step S410). On the other hand, when the trajectory of the host vehicle M does not satisfy the speed and acceleration restriction, the lane change possibility determination unit 116 determines that lane change is not possible (Step S412).

When a negative determination is obtained in Step S400, the lane change possibility determination unit 116 determines whether monitoring target vehicle mC catches up with mA (Step S414). When the monitoring target vehicle mC catches up with mA (refer to the lower middle drawing in FIG. 14), the lane change possibility determination unit 116 generates a trajectory of the host vehicle M using a point at which the monitoring target vehicle mC catches up with mA as an end point (Step S416), and the process advances to Step S408.

On the other hand, when the monitoring target vehicle mC does catch up with mA (refer to the upper left drawing in FIG. 14), the lane change possibility determination unit 116 determines that lane change is possible (Step S410).

According to the vehicle control apparatus 100A of the present embodiment described above, it is possible to obtain the same effects as in the first embodiment, and it is determined whether a nearby vehicle that travels immediately behind the lane change target position T # set as a relative position with respect to a nearby vehicle that travels in the adjacent lane L2 that is adjacent to the host vehicle lane L1 catches up with another nearby vehicle, it is determined whether lane change is possible on the basis of the determination result, and thus it is possible to determine more appropriately whether lane change is possible.

Third Embodiment

Figure 27:
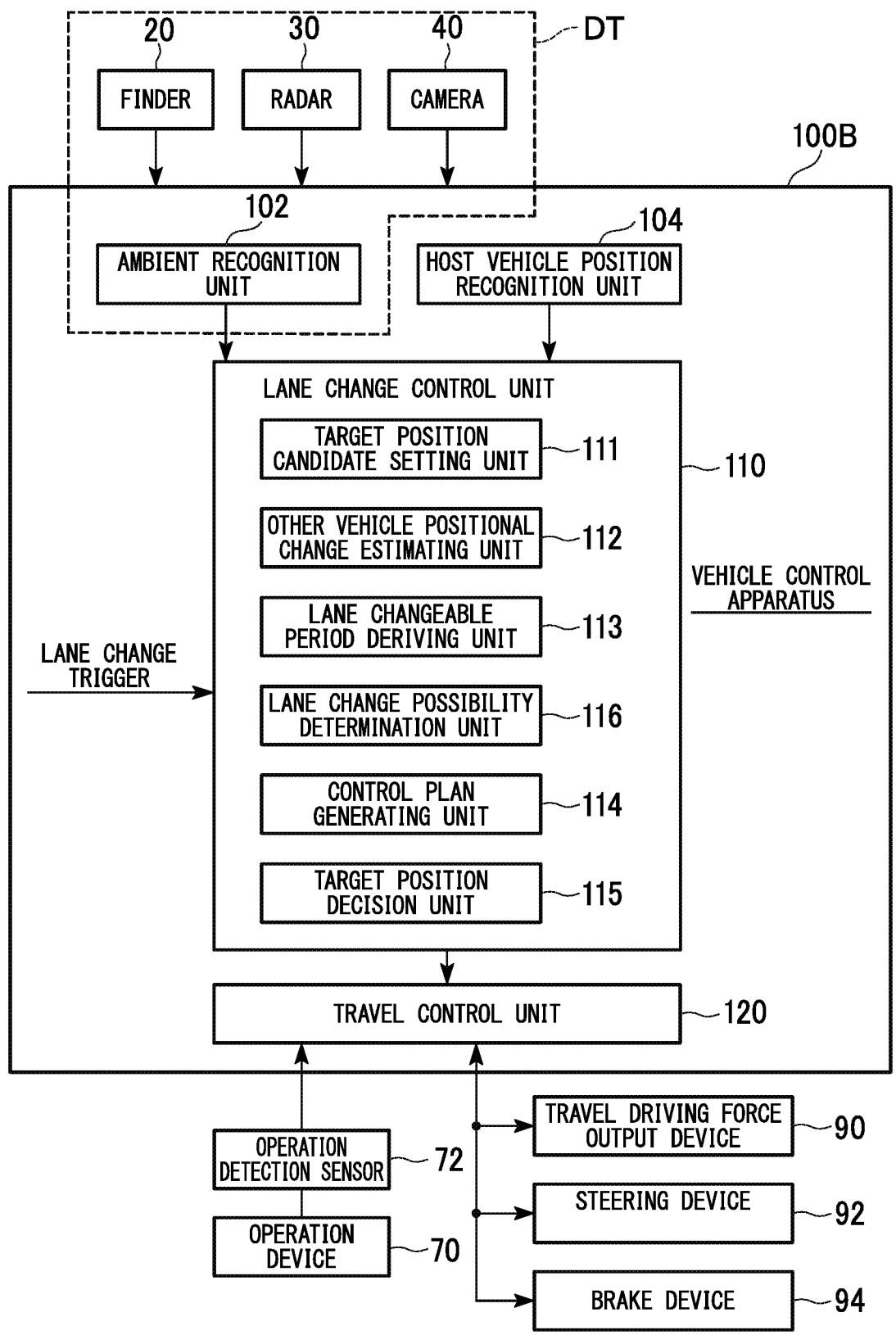
FIG. 27 is a functional block diagram of a host vehicle centered on a vehicle control apparatus according to a third embodiment.

A third embodiment will be described below. FIG. 27 is a functional block diagram of the host vehicle M centered on a vehicle control apparatus 100B according to the third embodiment. The vehicle control apparatus 100B according to the third embodiment does not include a component configured to generate an action plan in cooperation with the navigation device 50, and when any lane change trigger is input, performs lane change control, and otherwise, performs control in the manual driving mode. Here, the host vehicle position recognition unit 104 refers to a GNSS receiver, map information, and the like (not necessarily belonging to a navigation device) and recognizes a position of the host vehicle.

The lane change trigger is generated, for example, when a switching operation for lane change or the like is performed by the driver. In addition, the lane change trigger may be automatically generated according to a state of a vehicle.

In addition, in the present embodiment, a plurality of lane change target position candidates T are not set, but one lane change target position T # may be automatically set.

While forms for implementing the present invention have been described above with reference to embodiments, the present invention is not limited to the embodiments at all, and various modifications and substitutions can be made without departing from the spirit and scope of the present invention.

REFERENCE SIGNS LIST

20 Finder
30 Radar
40 Camera
50 Navigation device
60 Vehicle sensor
70 Operation device
72 Operation detection sensor
80 Selector switch
90 Travel driving force output device
92 Steering device
94 Brake device
100 Vehicle control apparatus
102 Ambient recognition unit
104 Host vehicle position recognition unit
106 Action plan generating unit
110 Lane change control unit
111 Target position candidate setting unit
112 Other vehicle positional change estimating unit
113 Lane changeable period deriving unit
114 Control plan generating unit
115 Target position decision unit
116 Lane change possibility determination unit
117 Narrowing unit
120 Travel control unit
122 Control switching unit
130 Storage unit
M Host vehicle

What is claim is:

1. A vehicle control apparatus comprising:
   a detector that detects a nearby vehicle that travels near a host vehicle;
   a processor configured to:
      estimate a positional change of the nearby vehicle detected by the detector;
      derive a lane changeable period during which lane change is possible to a lane change target position set as a relative position with respect to the nearby vehicle that travels in an adjacent lane that is adjacent to a host vehicle lane on the basis of a positional change of the nearby vehicle estimated; and
      narrow down a previously set lane change target position to a lane change target position at which the lane changeable period derived is longer than a preset period.

2. The vehicle control apparatus according to claim 1, wherein the processor is further configured to
   generate a control plan including a trajectory for lane change within a lane changeable period corresponding to the lane change target position narrowed down; and
   perform travel control of the host vehicle on the basis of the control plan generated.

3. The vehicle control apparatus according to claim 2, wherein the processor is further configured to
   decide a lane change target position on the basis of safety for evaluating an interval between the host vehicle and a nearby object and a planning ability for evaluating an element including followability to the trajectory regarding the control plan.

4. The vehicle control apparatus according to claim 2, wherein the processor is further configured to
   decide a position corresponding to a control plan having a wide interval between the trajectory for the host vehicle to change lanes and a nearby object within the control plan as a lane change target position.

5. The vehicle control apparatus according to claim 2, wherein the processor is further configured to
   decide a position corresponding to a control plan having low acceleration and deceleration of the host vehicle necessary for the lane change within the control plan as a lane change target position.

6. The vehicle control apparatus according to claim 1, wherein the processor is further configured to
   generate a control plan including a trajectory for lane change within a lane changeable period derived, and
   perform travel control of the host vehicle on the basis of the control plan generated.

7. The vehicle control apparatus according to claim 6, wherein the processor is further configured to derive a speed restriction for lane change to the lane change target position within a lane changeable period derived by the period deriving unit and generate the control plan under the derived speed restriction.

8. The vehicle control apparatus according to claim 1, wherein the processor is further configured to derive the lane changeable period by a different method according to a position distribution between the host vehicle and a nearby vehicle which is a monitoring target among nearby vehicles detected by the detector.

9. The vehicle control apparatus according to claim 8, wherein the nearby vehicle which is the monitoring target includes a nearby vehicle that travels immediately before the host vehicle among nearby vehicles detected by the detector and nearby vehicles that travel immediately before and immediately behind the lane change target position.

10. The vehicle control apparatus according to claim 1, wherein the processor is further configured to derive the lane changeable period using a timing derived on the basis of the positional change of the nearby vehicle estimated which is a timing at which the nearby vehicle which is the monitoring target among nearby vehicles detected by the detector catches up with another nearby vehicle as a criterion.

11. The vehicle control apparatus according to claim 10, wherein the processor is further configured to derive a period until a nearby vehicle that travels immediately behind the lane change target position catches up with a nearby vehicle that travels immediately before the lane change target position as the lane changeable period.

12. The vehicle control apparatus according to claim 10, wherein the processor is further configured to derive a period until a nearby vehicle that travels immediately behind the lane change target position catches up with a nearby vehicle that travels immediately before the host vehicle as the lane changeable period.

13. The vehicle control apparatus according to claim 10, wherein, when the host vehicle needs to overtake a nearby vehicle that travels immediately behind the lane change target position, the processor is further configured to derive a period after the overtake as the lane changeable period.

14. The vehicle control apparatus according to claim 10, wherein, when the host vehicle needs to be overtaken by a nearby vehicle that travels immediately before the lane change target position, the processor is further configured to derive a period after the overtaken as the lane changeable period.

15. A vehicle control apparatus comprising:
a detector that detects a nearby vehicle that travels near a host vehicle;
a processor configured to:
   estimate a positional change of the nearby vehicle detected by the detector;
   derive a lane changeable period during which lane change is possible to a lane change target position set as a relative position with respect to the nearby vehicle that travels in an adjacent lane that is adjacent to a host vehicle lane on the basis of a positional change of the nearby vehicle estimated; and
   narrow down a previously set lane change target position to a lane change target position corresponding to a predetermined number of lane changeable periods in order from long lane changeable periods among lane changeable periods derived.

16. A vehicle control apparatus comprising:
a detector that detects a nearby vehicle that travels near a host vehicle;
a processor configured to:
   estimate a positional change of the nearby vehicle detected by the detector;
   derive a lane changeable period during which lane change is possible to a lane change target position set as a relative position with respect to the nearby vehicle that travels in an adjacent lane that is adjacent to a host vehicle lane on the basis of a positional change of the nearby vehicle estimated; and
   narrow down a previously set lane change target position to a lane change target position corresponding to the longest lane changeable period among lane changeable periods derived.

17. A vehicle control method, using a processor, comprising:
detecting a nearby vehicle that travels near a host vehicle;
estimating a positional change of the detected nearby vehicle;
deriving a lane changeable period during which lane change is possible to a lane change target position set as a relative position with respect to the nearby vehicle that travels in an adjacent lane that is adjacent to a host vehicle lane on the basis of a positional change of the estimated nearby vehicle; and
narrowing down a previously set lane change target position to a lane change target position at which the derived lane changeable period is longer than a preset period.

18. A non-transitory computer readable medium that stores a vehicle control program causing an on-board computer to execute:
detecting a nearby vehicle that travels near a host vehicle;
estimating a positional change of the detected nearby vehicle;
deriving a lane changeable period during which lane change is possible to a lane change target position set as a relative position with respect to the nearby vehicle that travels in an adjacent lane that is adjacent to a host vehicle lane on the basis of a positional change of the estimated nearby vehicle; and
narrowing down a previously set lane change target position to a lane change target position at which the derived lane changeable period is longer than a preset period.

19. A vehicle control apparatus comprising:
a processor configured to:
detect a nearby vehicle that travels near a host vehicle;
estimate a positional change of the nearby vehicle detected by the detector; and
derive a lane changeable period during which lane change is possible to a lane change target position set in an adjacent lane as a relative position with respect to the nearby vehicle that travels in the adjacent lane that is adjacent to a host vehicle lane on the basis of a positional relation pattern where positional relations between the host vehicle and the nearby vehicle are classified and a positional change pattern where positional changes of the nearby vehicle estimated in the positional relation pattern are classified.

\* \* \* \* \*